US010990260B2

(12) United States Patent
Gorsica et al.

(10) Patent No.: US 10,990,260 B2
(45) Date of Patent: Apr. 27, 2021

(54) ELECTRONIC DEVICE CONTROL IN RESPONSE TO FINGER ROTATION UPON FINGERPRINT SENSOR AND CORRESPONDING METHODS

(71) Applicant: Motorola Mobility LLC, Chicago, IL (US)

(72) Inventors: John Gorsica, Round Lake, IL (US); Thomas Merrell, Beach Park, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/110,939

(22) Filed: Aug. 23, 2018

(65) Prior Publication Data

US 2020/0064995 A1 Feb. 27, 2020

(51) Int. Cl.
*G06F 3/0484* (2013.01)
*G06F 3/01* (2006.01)
(Continued)

(52) U.S. Cl.
CPC .......... *G06F 3/04847* (2013.01); *G06F 3/017* (2013.01); *G06F 3/0346* (2013.01);
(Continued)

(58) Field of Classification Search
CPC .... G06F 3/0346; G06F 3/04883; G06F 3/017; G06F 3/03547; G06F 3/04847; G06F 3/0485; G06F 21/32; G06F 3/0488; G06F 2/0487; G06F 3/0484; G06F 3/048; G06F 3/04144; G06F 3/0412; G06F 3/011; G06F 3/01; G06F 3/0354; G06F 3/033; G06F 21/31; G06F 21/30; G06F 21/00; G06F 2203/0381; G06K 9/0002; G06K 9/00013; G06K 9/00006; G06K 9/00
See application file for complete search history.

(56) References Cited

U.S. PATENT DOCUMENTS 9,245,165 B2 1/2016 Slaby et al.
9,939,958 B2 4/2018 Phipps et al.
(Continued)

OTHER PUBLICATIONS

Teather et al. "Tilt-Touch synergy: Input control for "dual-analog" style mobile games". Entertainment Computing 21 (2017) 33-43. (Year: 2017).*
(Continued)

*Primary Examiner* — Julie Anne Watko
(74) *Attorney, Agent, or Firm* — Philip H. Burrus, IV

(57) ABSTRACT

An electronic device includes a fingerprint sensor and one or more processors operable with the fingerprint sensor. One or more motion detectors are also operable with the one or more processors. The one or more processors determine with the fingerprint sensor, a direction of rotation of an object rotating, and in contact with, the fingerprint sensor. The one or more motion detectors detect whether the electronic device is rotating in three-dimensional space. The one or more processors then select and perform a first control operation when the object is rotating in a first axial direction and the electronic device is substantially stationary. Alternatively, the one or more processors select and perform a second control operation when the electronic device is rotating and the object is rotating in the first axial direction.

20 Claims, 12 Drawing Sheets

(51) Int. Cl.
*G06F 3/0346* (2013.01)
*G06F 3/0485* (2013.01)
*G06F 3/0487* (2013.01)
*G06F 3/16* (2006.01)
*G06F 3/0488* (2013.01)
*G06K 9/00* (2006.01)
*H04M 1/72448* (2021.01)
*G06F 3/0354* (2013.01)
*G06F 21/32* (2013.01)
*G06K 9/20* (2006.01)

(52) U.S. Cl.
CPC .......... *G06F 3/0485* (2013.01); *G06F 3/0487* (2013.01); *G06F 3/0488* (2013.01); *G06K 9/0002* (2013.01); *H04M 1/72448* (2021.01); *G06F 3/03547* (2013.01); *G06F 3/0484* (2013.01); *G06F 3/04883* (2013.01); *G06F 3/165* (2013.01); *G06F 21/32* (2013.01); *G06F 2203/0381* (2013.01); *G06F 2203/04806* (2013.01); *G06K 9/00013* (2013.01)

(56) References Cited

U.S. PATENT DOCUMENTS

| | | |
|---|---|---|
| 10,031,581 B1 | 7/2018 | Raman et al. |
| 2006/0187204 A1* | 8/2006 | Yi .................... G06F 1/1626 345/158 |
| 2008/0042978 A1* | 2/2008 | Perez-Noguera ....... G06F 3/023 345/168 |
| 2009/0225026 A1* | 9/2009 | Sheba .................. G06F 1/1626 345/156 |
| 2013/0035141 A1* | 2/2013 | Murakami .............. G06F 21/36 455/566 |
| 2013/0167074 A1* | 6/2013 | Oonishi .............. G06F 3/04847 715/799 |
| 2014/0079300 A1* | 3/2014 | Wolfer ............... G06K 9/00013 382/124 |
| 2014/0152597 A1* | 6/2014 | Lee ..................... G06F 3/04883 345/173 |
| 2014/0195907 A1* | 7/2014 | Lim .................... G06F 3/03547 715/702 |
| 2014/0270413 A1 | 9/2014 | Slaby et al. |
| 2014/0369572 A1* | 12/2014 | Setlak .................... G06F 21/32 382/124 |
| 2015/0135108 A1* | 5/2015 | Pope .................... G06F 3/0484 715/767 |
| 2015/0139511 A1* | 5/2015 | Yoon .................. G06K 9/00919 382/124 |
| 2015/0213244 A1* | 7/2015 | Lymberopoulos ...... G06F 21/45 726/18 |
| 2015/0324570 A1* | 11/2015 | Lee ..................... G06K 9/3208 382/124 |
| 2015/0371073 A1* | 12/2015 | Cho .................... G06F 3/0488 382/124 |
| 2016/0217310 A1* | 7/2016 | Shah ..................... G06K 9/001 |
| 2017/0011252 A1* | 1/2017 | Yang ..................... G06F 3/011 |
| 2017/0076132 A1* | 3/2017 | Sezan ............... G06K 9/00013 |
| 2017/0116455 A1 | 4/2017 | Alameh et al. |
| 2018/0011590 A1* | 1/2018 | Lee ..................... G06F 3/0416 |
| 2018/0107855 A1* | 4/2018 | Ernst .................... B62D 1/046 |
| 2018/0232558 A1* | 8/2018 | Jung .................. G06K 9/00073 |

OTHER PUBLICATIONS

Oakley et al. "Tilt and Feel: Scrolling with Vibrotactile Display". Proc. EuroHaptics 2004, pp. 316-323. Munich, Germany, Jun. 5-7, 2004. (Year: 2004).*
Shaw, Scott Jeffrey. "Fingerprint Angle Launcher". IPCOM000239991D. Synaptics, Dec. 19, 2014. (Year: 2014).*
Guitarte Perez, J, "Extended European Search Report", EP 19188348.7; dated Mar. 11, 2020.
Watko, Julie Anne,"NonFinal Office Action", U.S. Appl. No. 16/692,883, filed Nov. 22, 2019; dated Nov. 10, 2020.

* cited by examiner

ELECTRONIC DEVICE CONTROL IN RESPONSE TO FINGER ROTATION UPON FINGERPRINT SENSOR AND CORRESPONDING METHODS

BACKGROUND

Technical Field

This disclosure relates generally to electronic devices, and more particularly to electronic devices comprising fingerprint sensors.

Background Art

Portable electronic devices, such as smartphones, are nearly ubiquitous today. Advances in processing power and display resolution result in the owners of such devices using the same for many different purposes including, but not limited to, voice communications, text messaging, Internet browsing, commerce such as banking, and social networking.

As these devices become more sophisticated, they can also become more complicated to operate. Designers are constantly working to find techniques to simplify user interfaces and operating systems to allow users to take advantage of the sophisticated features of a device without introducing complicated control operations. Additionally, there is a design trend toward providing devices with cleaner aesthetics, fewer parting or other manufacturing lines, and more smooth surfaces. It would be advantageous to have an improved electronic device that simplified control techniques while maintaining clean design lines.

Figure 1A:
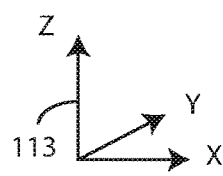
FIGS. 1A-1C illustrate one explanatory electronic device in accordance with one or more embodiments of the disclosure.
Figure 1A:
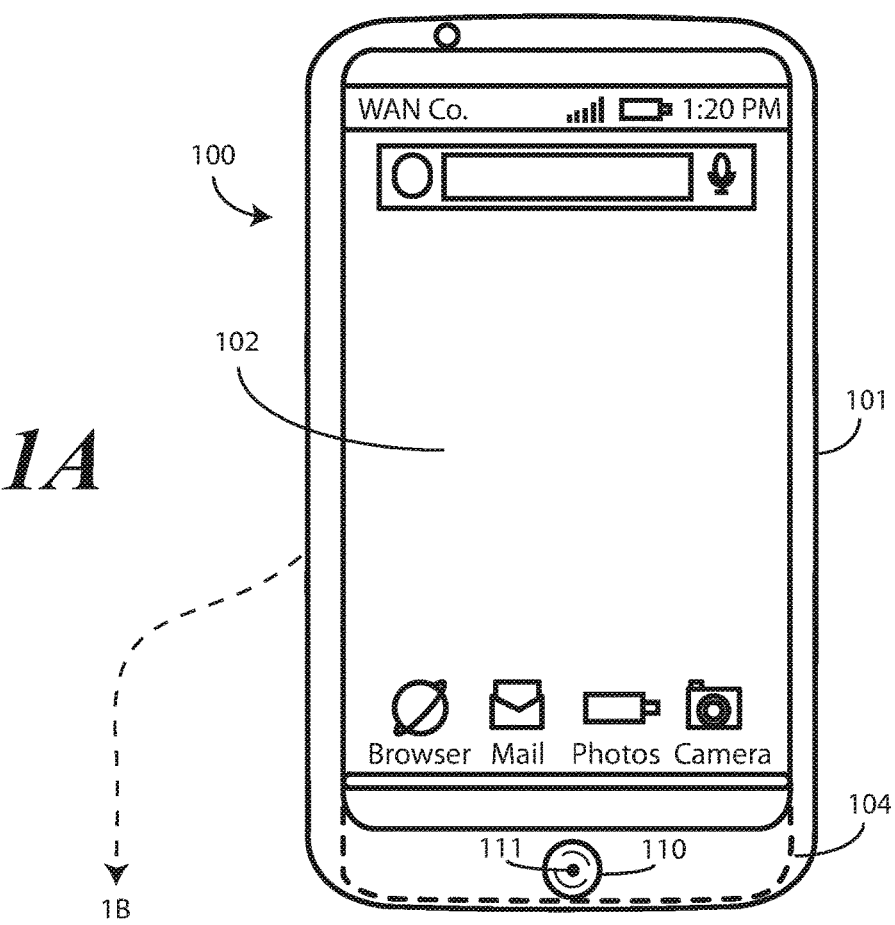

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting rotation of an object contacting a fingerprint sensor and performing a control operation, such as increasing or decreasing the volume of an audio output device, in response to the detection of the rotation. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of detecting rotation of an object, such as a finger, on a fingerprint sensor and performing one or more control operations in response thereto as described herein. The non-processor circuits may include, but are not limited to, a radio receiver, a radio transmitter, signal drivers, clock circuits, power source circuits, and user input devices. As such, these functions may be interpreted as steps of a method to perform a control operation in response to detecting a counterclockwise or clockwise rotation of a finger or other object abutting a fingerprint sensor. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The term "about" is used to refer to dimensions, orientations, or alignments inclusive of manufacturing tolerances. Thus, an "about orthogonal" angle with a manufacturing tolerance of plus or minus two degrees would include all angles between 88 and 92, inclusive. As used herein, the term "substantially" means "for the most part," or "essentially," but also includes the absolute. Accordingly, a "substantially stationary" electronic device includes electronic devices that are for the most part stationary, or are absolutely stationary. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods and systems for detecting, with a fingerprint sensor of an electronic device, rotation of an object, such as a user's finger, which is in contact with the fingerprint sensor, about an axis normal to the fingerprint sensor. In one or more embodiments, in addition to detecting that the object is rotating, the methods and systems detect an object rotation direction about the axis. For example, where the object is a user's finger, the methods and systems may detect rotation of the finger in contact with the fingerprint sensor, about an axis normal to the fingerprint sensor, as well as whether the finger is rotating clockwise or counterclockwise.

Embodiments of the disclosure also provide methods and systems for detecting, with one or more motion detectors, whether the electronic device is rotating in three-dimensional space about an axis normal to a major face of the electronic device. Where the electronic device is rotating about such an axis, the methods and systems can determine an electronic device rotation direction as well.

Based upon the object rotation direction and the electronic device rotation direction (where the electronic device is not stationary), control operations can be selected and performed. In one or more embodiments, two different control operations can be selected when the object rotation direction is in a first direction, e.g., clockwise. For example, where the electronic device is stationary or substantially stationary, and the object rotation direction is in a first direction, a first control operation can be selected. However, if the electronic device rotation direction is opposite that of the object rotation direction, the convention flips, with a second control operation being selected when the object rotation direction is in the first direction.

Accordingly, in one or more embodiments the methods and systems then select, with one or more processors of the electronic device, a control operation as a function of the object rotation direction and, if the electronic device is rotating, the electronic device rotation direction. Illustrating by example, where the object rotation direction is clockwise and the electronic device is stationary or substantially stationary, the one or more processors may select a first control operation. By contrast, when the object rotation direction is clockwise and the electronic device is rotating, e.g., when the electronic device rotation direction is counterclockwise, the one or more processors may select a second control operation that is different from the first control operation.

Advantageously, embodiments of the disclosure allow the selection of a first control operation by holding an electronic device in a substantially stationary or stationary state, and rotating a finger on a fingerprint sensor in a first direction about an axis normal to the fingerprint sensor, e.g., a clockwise direction. By contrast, a second control operation can be selected by holding the electronic device in a substantially stationary or stationary state and rotating a finger on the fingerprint sensor in a second direction about the axis that is different from the first direction, e.g., a counterclockwise direction. This allows a user, for example, to rotate a finger on the fingerprint sensor as if the fingerprint sensor was a tiny volume knob.

However, when the finger remains stationary, and the electronic device is rotated about an axis normal to a major face of the electronic device, the convention flips, thereby allowing the user to use the entire electronic device itself as a control knob. Illustrating by example, consider the situation where a user places a finger on the fingerprint sensor and holds it so as to be substantially stationary. Then imagine the user rotating the electronic device about an axis normal to the front surface of the electronic device to the left, i.e., counterclockwise. The fingerprint sensor will sense the object rotation direction to be clockwise. However, the one or more motion detectors will detect that the electronic device is not substantially stationary in three-dimensional space, but is rather rotating about the axis in a direction opposite the finger, namely, clockwise. Accordingly, rather than selecting the first control operation when the object rotation direction is clockwise and the electronic device is substantially stationary, the second control operation will be selected due to the fact that the electronic device rotation direction is opposite the object rotation direction.

Accordingly, assuming a clockwise rotation increasing function convention, and using embodiments of the disclosure where the first control operation is increasing a volume of an audio output device of the electronic device, and the second control operation is decreasing the volume of the audio output device, a user could increase the volume in one of two ways: First, the user could rotate the finger on the fingerprint sensor in a clockwise direction while the electronic device is substantially stationary, thereby using the fingerprint sensor like a tiny knob. Second, the user could hold their finger in a substantially stationary state on the fingerprint sensor and rotate the electronic device in a clockwise direction about an axis passing through the electronic device. While the fingerprint sensor determines that the object rotation direction is counterclockwise, the volume will still increase due to the fact that the electronic device itself is being used as a giant "knob" in accordance with the clockwise rotation increasing function convention.

Similarly, the user could decrease the volume in one of two ways: First, the user could rotate the finger on the fingerprint sensor in a counterclockwise direction while the electronic device is substantially stationary, thereby using the fingerprint sensor like a tiny knob in the other direction. Second, the user could hold their finger in a substantially stationary state on the fingerprint sensor and rotate the electronic device in a counterclockwise direction about an axis passing through the electronic device. While the fingerprint sensor determines that the object rotation direction is clockwise, the volume will still decrease due to the fact that the electronic device itself is being used as a giant "knob" in the other direction in accordance with the clockwise rotation increasing function convention.

Examples of control operations include increasing a volume of an audio output device, decreasing the volume of the audio output device, increasing an illumination level of a display or other visual output device, decreasing the illumination level of the display or other visual output device, adjusting a tone control of the audio output device, adjusting a panning control of a camera of the electronic device, adjusting a zooming control of the camera of the electronic device, or adjusting a scrolling control of a graphical user interface of the electronic device. These examples of control operations are illustrative only, as numerous others will be obvious to those of ordinary skill in the art having the benefit of this disclosure. For example, in another embodiment, a control operation causes the rotation of content being presented on a display. In this case the rotational relationship between the rendered content and the finger is being preserved. This control operation could be used to change the orientation of the device from portrait to landscape, or vice versa. Alternatively, the control operation could be to manipulate an image or web page. Other reasons for rotating content on a display will be obvious to those of ordinary skill in the art having the benefit of this disclosure.

Once the control operation is selected, in one or more embodiments the one or more processors then perform either the first control operation or the second control operation. In one or more embodiments, the one or more processors will perform the first control operation when either the electronic device is substantially stationary and the object rotation direction is clockwise, or when the electronic device is rotating and the object rotation direction is counterclockwise. By contrast, the one or more processors will perform the second control operation when either the electronic device is rotating and the object rotation direction is clockwise, or when the electronic device is substantially stationary and the object rotation direction is counterclockwise. Again illustrating by example, if where the object is a user's finger, and the finger is rotating clockwise and the electronic device is substantially stationary, the one or more processors might increase the volume of an audio output device, such as a loudspeaker. By contrast, if the finger is rotating counter clockwise and the electronic device is substantially stationary, the one or more processors may reduce the volume of the audio output device, and so forth.

In addition to object rotation direction, the control operation performed can further be a function of the axial displacement and rotation speed of the object contacting the fingerprint sensor. If, for example, the axial displacement of the finger is twenty degrees in the clockwise direction, the one or more processors may increase the volume of the audio output device less than if the axial displacement of the finger was forty degrees in the clockwise direction. Similarly, if the control operation was a scrolling operation of a graphical user interface, the one or more processors may cause the graphical user interface to scroll more quickly when the finger was rotating at six revolutions per minute than if it were rotating at three revolutions per minute, and so forth.

As noted above, modern electronic device designs trend toward clean design aesthetics. Designers are beginning to eschew parting lines, preferring smooth surfaces. This design trend makes protruding buttons, such as volume control buttons, less than appealing. Advantageously, embodiments of the disclosure provide for an intuitive, simple method for adjusting volume or another aspect of an electronic device that obviates the need for any protruding buttons. In one or more embodiments, to adjust the volume or optionally perform another control operation defined by the user, the user need only place their finger on the fingerprint sensor and twist the finger clockwise or counterclockwise while holding the electronic device in a substantially stationary state. By contrast, the user could equally adjust the volume or optionally perform another control operation defined by the user by placing their finger on the fingerprint sensor, holding it in a substantially stationary state, and twisting the electronic device in the same direction about an axis passing through the electronic device. This advantageously allows the user to employ the fingerprint sensor not only for user authentication, but also as a control device.

Embodiments of the disclosure contemplate that the action of an object twisting while in contact with the fingerprint sensor can occur as a result of at least three different situations. Where the object is a finger, in a first instance the electronic device may be stationary while the finger is rotating and in contact with the fingerprint sensor. In a second instance, the finger may be stationary while the user rotates the electronic device to create the "rotation" perceived by the fingerprint sensor.

In a third instance, the electronic device and finger can both be rotating. In this third instance, the electronic device and finger can be rotating in opposite directions. Alternatively, the electronic device and finger can be rotating in the same directions. Also, in this third instance the electronic device can be rotating faster than the finger rotates. Alternatively, the finger can be rotating faster than the electronic device rotates. Where such a situation occurs, in one or more embodiments the one or more processors determine which is greater in magnitude, the rotation of the object on the fingerprint sensor or the rotation of the electronic device. In one or more embodiments, the greater magnitude rotation will control. Consequently, if the finger is rotating faster than the electronic device, the electronic device will be treated as being substantially stationary in one or more embodiments. Where the electronic device is rotating faster than the finger, the finger will be treated as being substantially stationary in one or more embodiments.

Embodiments of the disclosure contemplate that where electronic devices have small form factors, it may be easier to rotate the electronic device than the finger. Accordingly, since this direction of rotation would be opposite, for a given convention, of the rotation of a finger to perform the same operation, embodiments of the disclosure monitor the movement of the electronic device in three-dimensional space in addition to monitoring rotation of objects contacting the fingerprint sensor to ensure that the proper operation is performed in accordance with a predefined convention.

Using the adjustment of the volume of an audio output device as an example control operation, if a finger rotating clockwise while the device is stationary increases the volume, rotation of the electronic device about an axis passing through the electronic device will increase the volume when the finger is stationary only where that rotation of the electronic device is in the same direction. Said differently, for a clockwise rotation increasing function convention, a clockwise rotation of a finger with the electronic device stationary, or a clockwise rotation of the electronic device about an axis passing through the electronic device with the finger stationary, will cause the volume to increase. By contrast, a counterclockwise rotation of a finger with the electronic device stationary, or a counterclockwise rotation of the electronic device about an axis passing through the electronic device with the finger stationary, will cause the volume to decrease.

Advantageously, embodiments of the disclosure are equipped to monitor both rotation of the electronic device and rotation of objects contacting the fingerprint sensor of the electronic device. In one or more embodiments, the fingerprint sensor monitors rotation of objects contacting the fingerprint sensor. One or more motion sensors, such as one or more accelerometers or gyroscopes, then monitor the motion and rotation of the electronic device. In one or more embodiments, the systems and methods are operable to not only detect rotation of one or both of the finger and/or the electronic device, but also to monitor and measure the direction of the rotation, the amount of rotation, and the speed of rotation of one or both of the finger and/or the electronic device as well.

Using one embodiment of the disclosure where the control operation is increasing or decreasing volume, a user may adjust the volume of an audio output device by placing the finger on the fingerprint sensor and twisting the finger clockwise or counter clockwise while the electronic device is stationary. In a clockwise rotation increasing function convention, rotating the finger clockwise would increase the volume of the audio output device, while rotating the finger counterclockwise would decrease the volume of the audio output device.

Conversely, for small form factor devices or in situations where the user preferred to move the electronic device with the finger remaining stationary, rotation of the electronic device about an axis passing through the electronic device in the same direction would cause the same functionality. This is true despite the fact that the "perceived" object rotation direction by the fingerprint sensor is in the opposite direction for that control operation as would be the case where the electronic device was substantially stationary. In a clockwise rotation increasing function convention, holding the finger stationary and rotating the electronic device clockwise would increase the volume of the audio output device, while holding the finger stationary and rotating the electronic device counterclockwise would decrease the volume of the audio output device, and so forth.

Embodiments of the disclosure contemplate that, to the fingerprint sensor, these two situations appear exact opposites. It appears, to the fingerprint sensor, like there is a clockwise rotation of an object contacting the fingerprint sensor when the electronic device is substantially stationary and the finger is rotating clockwise. By contrast, it appears to the fingerprint sensor like there is a counterclockwise rotation of the object contacting the fingerprint sensor when the finger is substantially stationary and the electronic device is being rotated in the clockwise direction. Despite this perceived contradiction, the same control function is selected in each state. Advantageously, to disambiguate the two situations, embodiments of the disclosure determine, with one or more motion detectors, whether the electronic device is rotating in three-dimensional space in addition to detecting an object rotating on the fingerprint sensor. Additionally, where the electronic device is rotating, the one or more motion detectors determine an electronic device rotation direction. This allows all three situational conditions to be supported to ensure that the proper control operation is performed.

In one or more embodiments, an electronic device comprises a fingerprint sensor and one or more processors operable with the fingerprint sensor. In one or more embodiments, a user can place a finger on the fingerprint sensor for authentication. The user can further control the electronic device by placing a finger on the fingerprint sensor and rotating the finger about an axis normal to the fingerprint sensor's contact surface while the electronic device is in a substantially stationary state. The one or more processors can select a control operation as a function of the object rotation direction. The fingerprint sensor can monitor and recognize the amount of rotation, reporting the direction and magnitude of the movement to the one or more processors. The one or more processors can then perform either a first control operation or a second control operation based upon whether the object rotation direction is clockwise or counterclockwise while the electronic device is in the substantially stationary state. The control operation can further be performed as a function of the magnitude and/or speed of rotation as well.

In one or more embodiments, the electronic device further includes one or more motion detectors. Examples of motion detectors include accelerometers, gyroscopes, combinations thereof, and the like. The one or more motion detectors can monitor whether the electronic device is rotating in three-dimensional space about an axis passing through the electronic device. Accordingly, the user can control the electronic device by placing a finger on the fingerprint sensor, holding the finger in a substantially stable state, gripping the electronic device, and then rotating the electronic device about an axis, for example, passing through the finger and fingerprint sensor. In one or more embodiments, the fingerprint sensor and the gyroscope both recognize the amount and direction of rotation and are used to determine the direction and magnitude of rotation of the finger. In still other embodiments, a combination of electronic device rotation and finger direction can be used to control the device as noted above.

Regardless of which situation causes the rotation, i.e., the finger rotating while the electronic device is stationary, or the electronic device rotating while the finger is stationary, in one or more embodiments the resultant detected rotation can be used to perform a control operation to change settings of the electronic device in one or more embodiments. These device settings can include control of the volume of audio output devices of the electronic device, control of the volume of a companion device, such as ear buds, a wireless loudspeaker, or other device, adjustment of the brightness of an illumination device or display of the electronic device, and so forth.

Figure 1B:
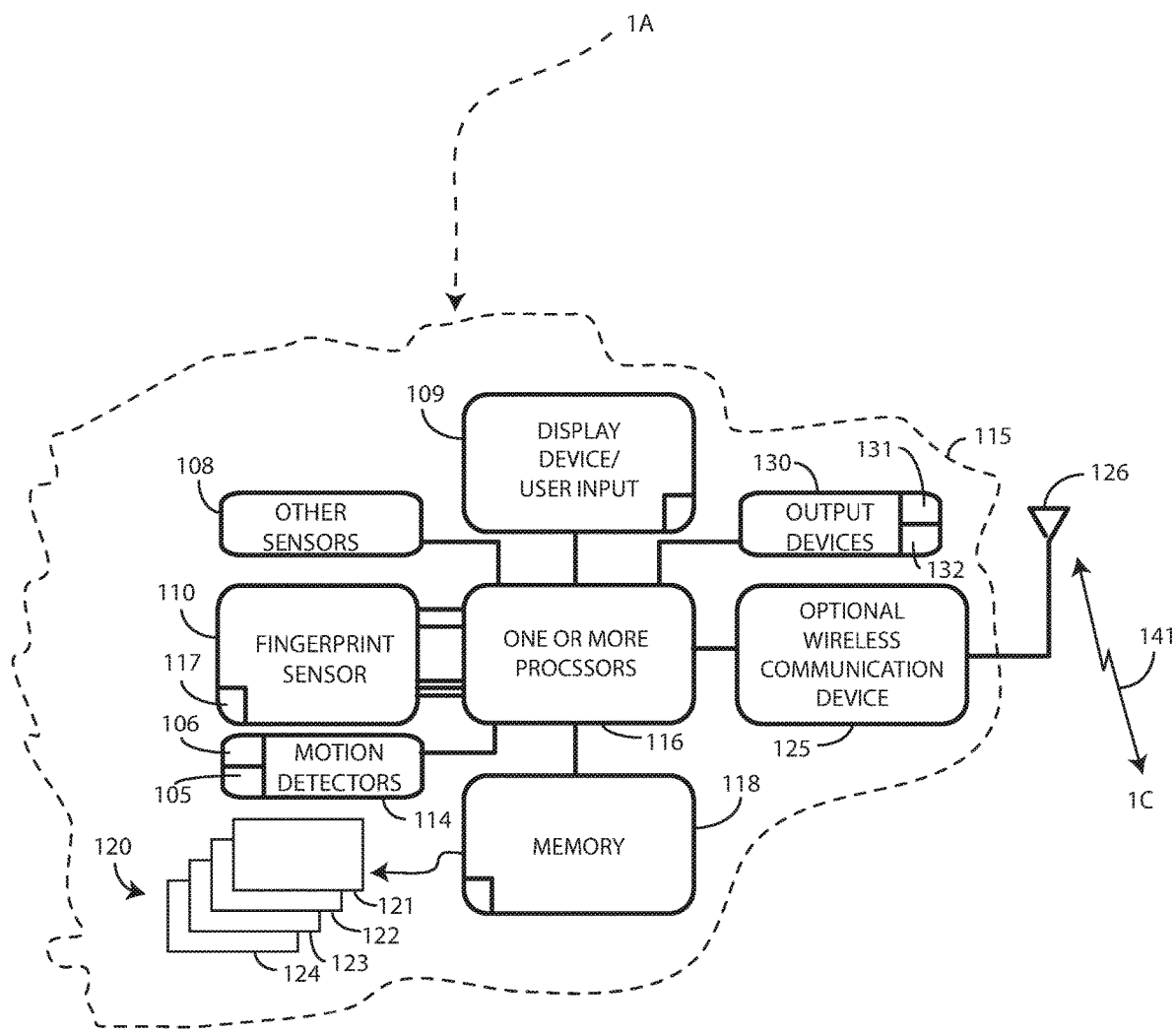
Figure 1C:
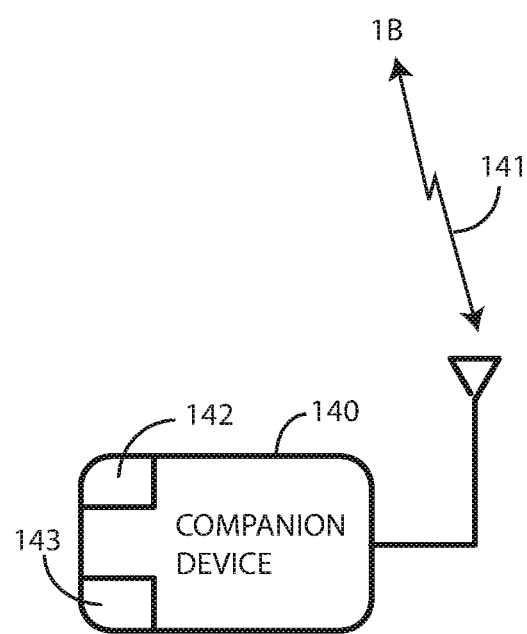

Turning now to FIGS. 1A-1C, illustrated therein is one explanatory electronic device 100 configured in accordance with one or more embodiments of the disclosure. The electronic device 100 of FIG. 1A is a portable electronic device, and is shown as a smart phone for illustrative purposes. However, it should be obvious to those of ordinary skill in the art having the benefit of this disclosure that other electronic devices may be substituted for the explanatory smart phone of FIG. 1A. For example, the electronic device 100 could equally be a palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. Features can be incorporated into the housing 101, including an optional camera or an optional speaker port.

A block diagram schematic 115 of the electronic device 100 is also shown in FIG. 1B. In one or more embodiments, the block diagram schematic 115 is configured as a printed circuit board assembly disposed within a housing 101 of the electronic device 100. Various components can be electrically coupled together by conductors or a bus disposed along one or more printed circuit boards.

The illustrative block diagram schematic 115 of FIG. 1B includes many different components. Embodiments of the disclosure contemplate that the number and arrangement of such components can change depending on the particular application. Accordingly, electronic devices configured in accordance with embodiments of the disclosure can include some components that are not shown in FIGS. 1A-1C, and other components that are shown may not be needed and can therefore be omitted.

In one embodiment, the electronic device 100 includes one or more processors 116. In one embodiment, the one or more processors 116 can include an application processor and, optionally, one or more auxiliary processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 115. Each of the application processor and the auxiliary processor(s) can be configured to process and execute executable software code to perform the various functions of the electronic device with which the block diagram schematic 115 operates. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 109, which can include the display 102, to present presentation information to a user. The executable software code used by the one or more processors 116 can be configured as one or more modules 120 that are operable with the one or more processors 116. Such modules 120 can store instructions, control algorithms, logic steps, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100. The application layer 124 can be responsible for executing application service modules. The application service modules may support one or more applications or "apps, such as a cellular telephone application for making voice telephone calls or a web browsing application to allow the user to view webpages on the display 102 of the electronic device 100. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one or more embodiments, the block diagram schematic 115 includes one or more motion detectors 114. The one or more motion detectors 114 can include one or more accelerometers 105 and/or gyroscopes 106. For example, an accelerometer 105 may be embedded in the electronic circuitry of the electronic device 100 to show vertical orientation in three-dimensional space 113, constant tilt, whether the electronic device 100 is stationary, and/or whether the electronic device 100 is moving or rotating about an axis 111 (normal to the page as viewed in FIG. 1A) in three-dimensional space 113. The measurement of tilt relative to gravity is referred to as "static acceleration," while the measurement of rotation, motion, and/or vibration is referred to as "dynamic acceleration." A gyroscope 106 can be used in a similar fashion. Additionally, the one or more motion detectors 114 can be used to sense some of the gestures of the user, such as one talking with their hands, running, or walking.

The one or more motion detectors 114 can also determine the spatial orientation and/or rotation of the electronic device 100 in three-dimensional space 113 by, for example, detecting a gravitational direction. In addition to, or instead of, an accelerometer 105, an electronic compass can be included to detect the spatial orientation of the electronic device 100 relative to the earth's magnetic field. Similarly, one or more gyroscopes 106 can be included to detect rotational orientation, including rotational direction, rotational amount, and rotational speed of the electronic device 100 in three-dimensional space 113.

In one or more embodiments, a fingerprint sensor 110 is operable with the one or more processors 116. In one embodiment, the fingerprint sensor 110 includes its own associated processor 117 to perform various functions, including detecting a finger touching the fingerprint sensor 110, capturing and storing fingerprint data from the finger, rotation of the finger or other object contacting the fingerprint sensor, authenticating a user by comparing captured fingerprint data to stored fingerprint data, and/or detecting user actions across a surface of the fingerprint sensor 110.

In one embodiment, the fingerprint sensor 110 includes a plurality of sensors. The fingerprint sensor 110 can be a complementary metal-oxide-semiconductor active pixel sensor digital imager or any other fingerprint sensor. For example, in one embodiment the plurality of sensors comprise indium-tin oxide electrical conductors that are deposited along a surface of the fingerprint sensor 110.

The fingerprint sensor 110 can be configured to capture, with the plurality of sensors, a live scan of a fingerprint pattern from a finger disposed along its surface, and to store this information as fingerprint data from the user's finger. The fingerprint sensor 110 may also be able to capture one or more images with the plurality of sensors. The images can correspond to an area beneath a surface of skin. The fingerprint sensor 110 can compare the fingerprint data or skin images to one or more references to authenticate a user in an authentication process.

In one or more embodiments, the fingerprint sensor 110 can optionally detect user actions across the fingerprint sensor 110. One example of such an action is detecting the rotation of an object, such as a finger, contacting the fingerprint sensor 110 about an axis 111 normal to the contact surface of the fingerprint sensor 110. Illustrating by example, once the fingerprint sensor 110 detects a user's finger touching the contact surface of the fingerprint sensor 110, the fingerprint sensor 110 can then detect an action of the finger along the fingerprint sensor 110.

In one or more embodiments, this action comprises rotation of the finger about an axis 111 normal to the contact surface of the fingerprint sensor 110. Alternatively, the action can comprise movement of the finger along the fingerprint sensor 110 in one or more directions. For instance, where the contact surface of the fingerprint sensor 110 defines an X-Y plane, with the X-axis defining a horizontal axis and the Y-axis is oriented orthogonal to the X-axis, the fingerprint sensor can further detect movement along the X-axis or Y-axis to control operations of the electronic device.

In one or more embodiments, the fingerprint sensor can be placed beneath a fascia 104 of the electronic device 100. In one or more embodiments, no other buttons or controls are included along the exterior surface of the electronic device 100, thereby providing a sleek and seamless appearance. Embodiments of the disclosure contemplate that it can be advantageous to place a fingerprint sensor 110 under a continuous glass or sapphire fascia 104 of the electronic device 100, as doing so improves the overall appearance, prevents the ingress of liquids and other materials, and reduces cost. Thus, in one or more embodiments the fingerprint sensor 110 is simply disposed beneath the fascia 104 of the electronic device 100. This can further allow the electronic device 100 to be waterproof in one or more embodiments.

In one or more embodiments, the one or more processors 116 may generate commands or execute control operations based on information received from detected rotation along a contact surface of the fingerprint sensor 110. The one or more processors 116 may also generate commands or execute control operations based upon information received from a combination of the fingerprint sensor 110 and one or more motion detectors 114. Alternatively, the one or more processors 116 can generate commands or execute control operations based upon information received from the one or more motion detectors 114 alone. Moreover, the one or more processors 116 may process the received information alone or in combination with other data, such as the information stored in the memory 118.

In one or more embodiments, the one or more processors 116 and/or the dedicated processor 117 (where included) can assign a quality score to fingerprint data obtained from the fingerprint sensor 110 when the fingerprint sensor 110 scans or otherwise attempts to detect an object such as a finger being proximately located with the fingerprint sensor 110. This quality score can be a function of one or more factors, including the number of fingerprint features found in a scan or image, the signal to noise ratio of the scan or image, the contrast of the scan or image, or other metrics. The one or more processors 116, or alternatively the dedicated processor 117 associated with the fingerprint sensor 110, can then compare fingerprint data captured by the fingerprint sensor 110 to a reference file stored in memory 118 to authenticate a user.

Various sensors 108 can be operable with the one or more processors 116. One example of a sensor 108 is a geo-locator that serves as a location detector able to determine location data of the electronic device 100. The one or more other sensors 108 may include a microphone. The one or more other sensors 108 may also include touch sensors, a touch pad sensor, a touch screen sensor, a capacitive touch sensor, and one or more switches. Touch sensors may used to indicate whether any of the user actuation targets present on the display 102 are being actuated. Alternatively, touch sensors disposed in the housing 101 can be used to determine whether the electronic device 100 is being touched at side edges or major faces of the electronic device 100 are being performed by a user. The touch sensors can include surface and/or housing capacitive sensors in one embodiment. The other sensors can also include video sensors (such as a camera).

The other sensors 108 can further include time sensors, date sensors, environmental sensors, weather sensors, ultrasonic sensors, location sensors, and so forth. Still other sensors 108 will be obvious to those of ordinary skill in the art having the benefit of this disclosure. For example, a skin sensor can be included to determine when the electronic device 100 is proximately located with the skin of a user. A light sensor can be used to detect whether or not direct light is incident on the housing 101 of the electronic device 100.

The other sensors 108 can further include one or more proximity sensors that are operable with the one or more processors 116. In one embodiment, the one or more proximity sensors include one or more proximity sensor components. The proximity sensors can also include one or more proximity detector components. In one embodiment, the proximity sensor components comprise only signal receivers. By contrast, the proximity detector components include a signal receiver and a corresponding signal transmitter.

While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers.

Many of the sensors 108 in the electronic device 100 can be used to detect movement, gestures, or other user input. For example, the one or more proximity sensors can detect the gesture of a user waving a hand above the display 102. In another embodiment, the user can deliver gesture input by touching the display 102. In yet another embodiment, the accelerometer can detect gesture input from a user lifting, shaking, or otherwise deliberately moving the electronic device 100. In yet other embodiments, the user can deliver gesture input by rotating or changing the orientation of the electronic device 100, which can be detected by multiple accelerometers 105 or a gyroscope 106.

One or more output devices 130 can be operable with the one or more processors. These output devices 130 can include audio output devices 131, visual output devices 132, haptic feedback devices, or other output devices. In one or more embodiments, the audio output devices 131 comprise one or more audio transducers. The audio transducers, in one embodiment, each comprise a loudspeaker. In one or more embodiments, the one or more processors 116 are operable to adjust a volume output of the audio output devices 131 in response to user input, which in one case is a rotation of a finger along a contact surface of the fingerprint sensor 110.

The visual output devices 132 can include lights, backlights, or other illumination devices that emit light. The display 102, for example, can include a visual output device 132 in the form of a backlight. In one or more embodiments, the one or more processors 116 are operable to adjust a luminous output of the visual output devices 132 in response to user input, which in one case is a rotation of a finger along a contact surface of the fingerprint sensor 110.

The electronic device 100 can be operable with a companion device 140, shown in FIG. 1C. Using wireless communication signals 141 from the communication circuit 125, the one or more processors 116 can communicate with the companion device 140 of FIG. 1C. Examples of companion devices 140 include wireless speakers, media players, wireless ear buds, smart watches, gaming devices, and so forth. Other examples of companion devices 140 will be obvious to those of ordinary skill in the art having the benefit of this disclosure.

In one or more embodiments, the companion device 140 of FIG. 1C includes one or both of an audio output device 142 or a visual output device 143. Illustrating by example, where the companion device 140 is a wireless speaker or ear bud, it will include a loudspeaker and may emit audible output received from the wireless communication signals 141. In one or more embodiments, the one or more processors 116 are operable to adjust a volume output of the audio output device(s) 142 of the companion device 140 in response to user input received at the electronic device 100, which in one case is a rotation of a finger along a contact surface of the fingerprint sensor 110.

Similarly, where the companion device 140 is a monitor, it may include a visual output device 143 such as a display. A user may cause content, such as a video, picture, movie, or television show, to be delivered from the electronic device 100 to the companion device 140 using the wireless communication signals 141. As with the electronic device 100, in one or more embodiments the one or more processors 116 are operable to adjust a luminous output of the visual output devices 143 of the companion device 140 in response to user input received at the electronic device 100, which in one case is a rotation of a finger along a contact surface of the fingerprint sensor 110.

It is to be understood that FIGS. 1A-1C are provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIGS. 1A-1C, or may include a combination of two or more components or a division of a particular component into two or more separate components, and still be within the scope of the present disclosure.

Figure 2:
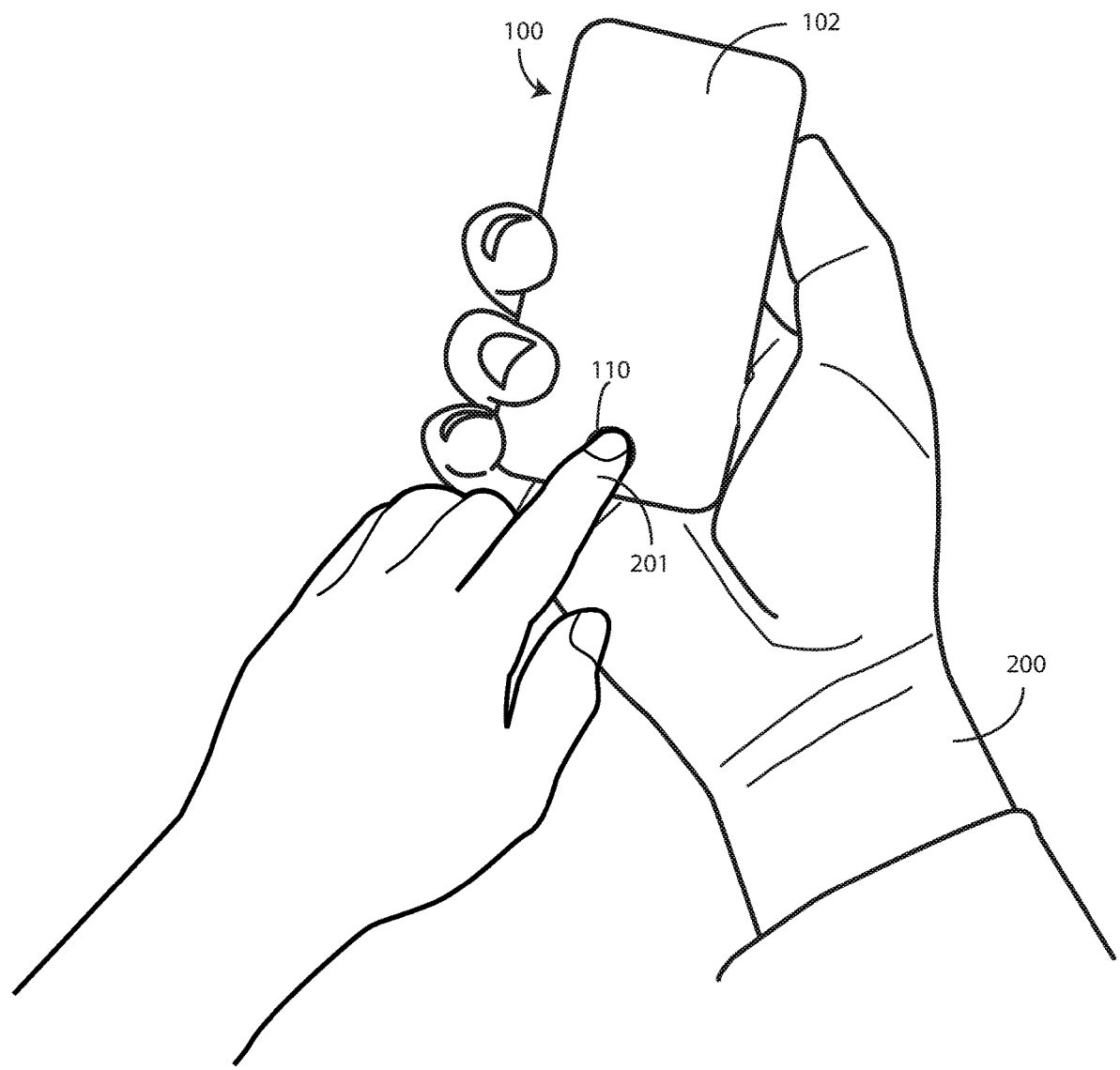
FIG. 2 illustrates one or more method steps in accordance with one or more embodiments of the disclosure.

Turning now to FIG. 2, illustrated therein are one or more method steps for an electronic device 100 in accordance with one or more embodiments of the disclosure. As shown in FIG. 2, a user 200 is interacting with the fingerprint sensor 110 of the electronic device 100 by placing their finger 201 against the contact surface of the fingerprint sensor 110. While this is occurring, the user 200 is also holding the electronic device 100 in a substantially stationary state. As noted above, this substantially stationary state includes not only situations when the electronic device 100 is for the most part stationary, but also situations in which the electronic device 100 is absolutely stationary.

In one or more embodiments, the one or more processors (116) or the processor (117) associated with the fingerprint sensor 110, where included, are the operable to capture, with the plurality of sensors, a live scan of a fingerprint pattern from a finger 201 disposed along its contact surface. In one or more embodiments, the one or more processors (116) or the processor (117) associated with the fingerprint sensor 110 can also be operable to store this information as fingerprint data from the user's finger 201 in the memory (118). In one or more embodiments, the fingerprint sensor 110 may also be able to capture one or more images of the finger 201. The images can correspond to an area beneath a surface of skin.

In one or more embodiments, the one or more processors (116) or the processor (117) associated with the fingerprint sensor 110 can optionally assign a quality score to fingerprint data obtained from the fingerprint sensor 110. The quality score assigned can be a function of one or more factors, including the number of fingerprint features from the finger 201 found in a scan or image, the signal to noise ratio of the scan or image, or the contrast of the scan or image. Other quality metrics will be obvious to those of ordinary skill in the art having the benefit of this disclosure. The one or more processors (116) or the processor (117) associated with the fingerprint sensor 110 can optionally compare the quality score to a predefined threshold to determine whether the object is indeed a finger, and even preclude the fingerprint data from consideration for authentication if the quality score is too low.

Where the quality score is omitted, or where the quality score is included and is sufficiently high, in one or more embodiments the one or more processors (116) or the processor (117) associated with the fingerprint sensor 110 can then attempt to authenticate the fingerprint data. The one or more processors (116) or the processor (117) associated with the fingerprint sensor 110 can do this by comparing the fingerprint data to a reference file stored in memory (118). Where there is a sufficient match, the one or more processors (116) or the processor (117) associated with the fingerprint sensor 110 can perform a control operation. Examples of control operations include unlocking the electronic device 100, actuating the display 102, actuating apps, making stored data available to the user 200, rotating content being presented on the display 102, and so forth. Other control operations will be obvious to those of ordinary skill in the art having the benefit of this disclosure. Where there is not a sufficient match, the one or more processors (116) or the processor (117) associated with the fingerprint sensor 110 can take no action, or alternatively lock the electronic device 100.

Figure 3A:
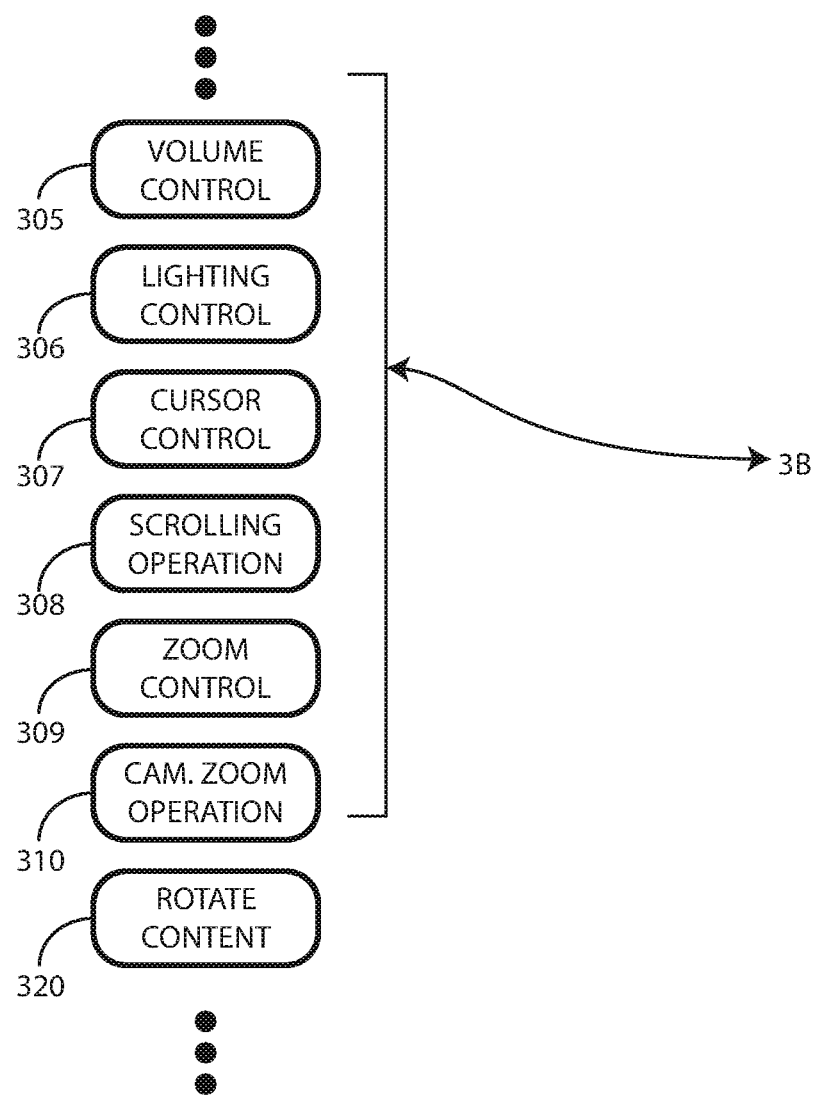
FIGS. 3A-3B illustrate one or more method steps in accordance with one or more embodiments of the disclosure.
Figure 3B:
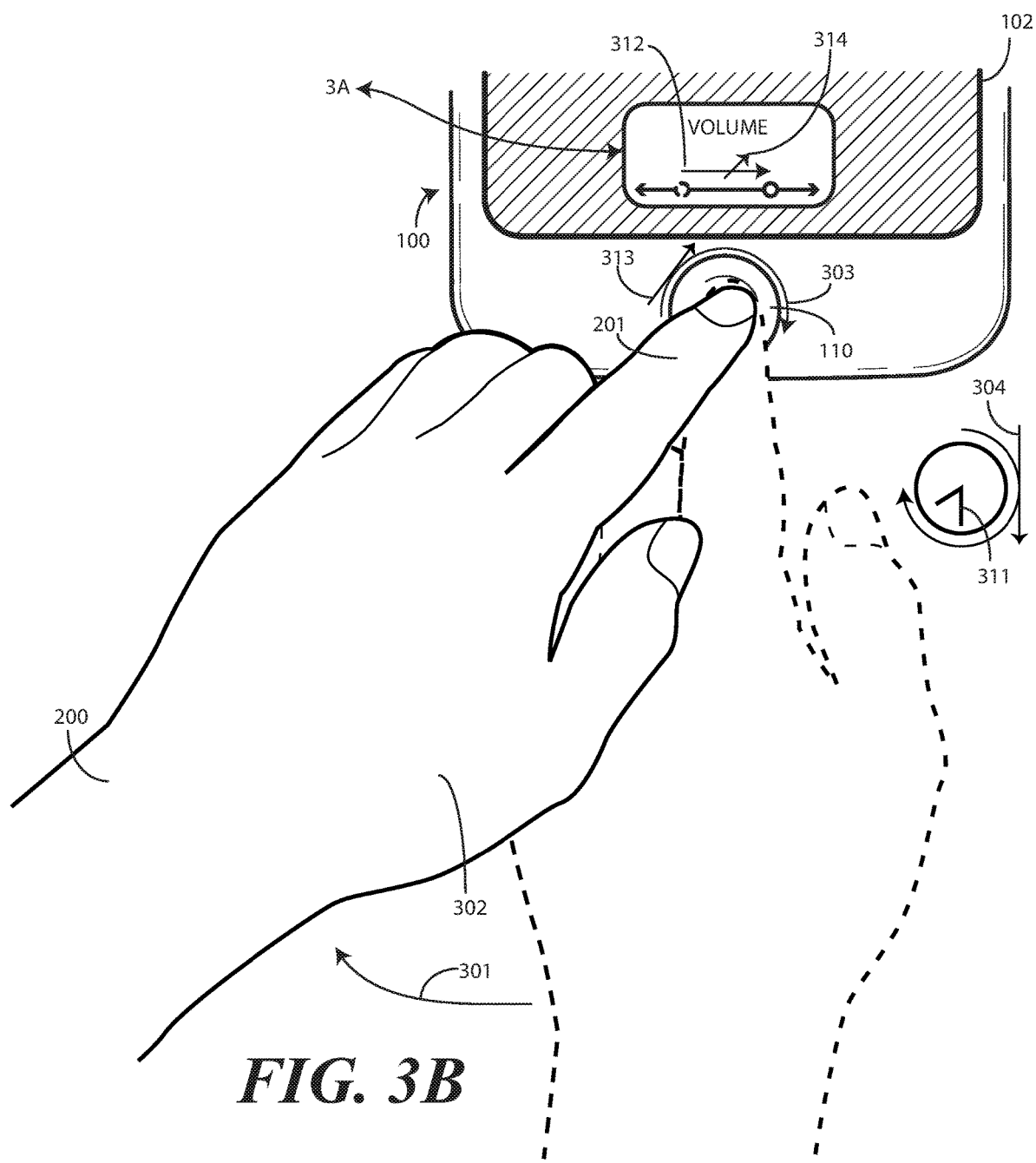

Turning now to FIGS. 3A-3B, illustrated therein are one or more method steps that can occur in the electronic device 100 in accordance with embodiments of the disclosure in addition to the authentication process described above with reference to FIG. 2.

As shown in FIGS. 3A-3B, the user 200 has placed the finger 201 on the contact surface of the fingerprint sensor 110. The finger 201 therefore constitutes an object contacting the fingerprint sensor 110. In this example, the electronic device 100 remains in a substantially stationary state.

The user then rotates 301 their hand 302 clockwise while the electronic device 100 is substantially stable, which causes the finger 201 to rotate 303 clockwise across the contact surface of the fingerprint sensor 110. In one or more embodiments, the fingerprint sensor 110 detects this rotation by capturing, with a plurality of sensors, a plurality of scans of the fingerprint pattern from the finger 201 as it rotates 303, but while the one or more motion detectors (114) detect an absence of rotation for the electronic device 100, i.e., that the electronic device 100 is substantially stationary. Alternatively, the fingerprint sensor 110 may capture one or more images of the finger 201 as it rotates 303 with the plurality of sensors, but while the one or more motion detectors (114) detect an absence of rotation for the electronic device 100. In one or more embodiments, in addition to detecting the rotation 303 of the finger 201, the fingerprint sensor 110 further detects an object rotation direction 304 while the electronic device 100 is substantially stationary, which in this illustrative example is clockwise. The object rotation direction 304 defines an axial direction in which the finger 201 rotates while the electronic device 100 is substantially stationary.

Upon detecting that the finger 201 is rotating 303, the electronic device 100 is substantially stationary, and the object rotation direction 304, in one or more embodiments the one or more processors (116) of the electronic device 100 can select and perform a control operation. One example of such a control operation 305 is increasing or decreasing a volume of an audio output device (131) of the electronic device 100, such as a loudspeaker. However, other control operations can be performed as well. In one or more embodiments, the control operation to be performed in response to rotation 303 of the finger 201 about an axis (111) normal to the contact surface of the fingerprint sensor 110 while the electronic device 100 is substantially stationary can be defined by the user 200 in the settings of the electronic device 100.

For instance, in one embodiment a control operation 306 comprises increasing or decreasing an illumination level of a visual output device (132) of the electronic device 100. The user 200 may set this as the control operation 306 to be performed in response to a finger 201 rotating 303 when in contact with the fingerprint sensor 110 while the electronic device 100 is substantially stationary. Accordingly, in one embodiment, the control operation 306 can comprise increasing the brightness of the display 102 in response to detecting the fact that the finger 201 is rotating 303 and the object rotation direction 304 while the electronic device 100 is substantially stationary.

In another embodiment, the control operation 307 can comprise controlling a cursor presented on the display 102. Rotating 303 or twisting the finger 201 with the object rotation direction 304 occurring clockwise while the electronic device 100 is substantially stationary may move the cursor to the right in one embodiment, while rotating 303 or twisting the finger 201 with the object rotation direction 304 occurring counterclockwise while the electronic device 100 is substantially stationary may move the cursor left, for example In another embodiment, the control operation 308 comprises panning through data presented on a display 102 of the electronic device 100. In one or more embodiments, this panning operation comprises a directional scrolling operation that advances objects presented on a visual output, such as the display 102, of the electronic device. Accordingly, the user 200 can flip through images in a gallery or contacts in a contact list, for example, by rotating 303 the finger 201 on the fingerprint sensor 110 while the electronic device 100 is substantially stationary.

In yet another embodiment, the control operation 309 comprises performing a zoom operation on the data presented on the display 102 of the electronic device 100. In still another embodiment, the control operation 310 comprises performing a zoom operation for an imager, thereby one of moving a lens closer or further from a sensor, performing a digital zoom operation with the imager, or combinations thereof.

In another embodiment, the control operation 320 comprises rotating content being presented on the display 102. In prior art systems, such an action requires the use of two fingers. Embodiments of the disclosure contemplate that twisting a finger is a more "natural" action. When this control operation 320 is performed, the rotational relationship between the rendered content and the finger 201 is being preserved in one or more embodiments. This control operation 320 can be used to change the orientation of the electronic device 100 from portrait to landscape or vice versa. Alternatively, the control operation 320 could be used to manipulate an image or web page. Other reasons for rotating content presented on the display 102 will be obvious to those of ordinary skill in the art having the benefit of this disclosure. Moreover, other control operations will be obvious to those of ordinary skill in the art having the benefit of this disclosure.

In one or more embodiments, the control operation selected will be selected as a function of the object rotation direction 304 when the electronic device 100 is substantially stationary. For example, where the control operation 305 comprises adjustment of the volume of an audio output device (131) of the electronic device 100, this control operation 305 could be one of two operations: increasing the volume of an audio output device (131) of the electronic device 100 or, alternatively, decreasing the volume of an audio output device (131) of the electronic device 100.

Since the control operation 305 can be one of two control operations, in one or more embodiments the control operation 305 selected is selected with a function convention that corresponds to the object rotation direction 304 while the electronic device 100 is substantially stationary. For instance, in one or more embodiments the one or more processors (116) of the electronic device 100 will select a first control operation, e.g., increasing the volume of the audio output device (131) of the electronic device 100 when the object rotation direction 304 is clockwise and the electronic device 100 is substantially stationary. By contrast, the one or more processors (116) of the electronic device 100 will select a second control operation, different from the first control operation, e.g., decreasing the volume of the audio output device (131) of the electronic device 100 when the object rotation direction 304 is counterclockwise and the electronic device 100 is substantially stationary. The one or more processors (116) of the electronic device 100 can then perform either the first control operation or the second control operation based upon whether the object rotation direction 304 is clockwise or counterclockwise and the fact that the electronic device 100 is substantially stationary.

In this illustration, the first control operation comprises increasing the volume of the audio output device (131) of the electronic device 100 when the object rotation direction 304 is clockwise while the electronic device 100 is substantially stationary. Accordingly, the volume increases in response to the finger 301 twisting while the electronic device 100 is substantially stationary. In one or more embodiments, the control operation to be performed in response to object rotation direction 304 can be defined by the user 200 in the settings of the electronic device 100. Accordingly, one user can define the function convention to be an increasing volume with an object rotation direction 304 that is clockwise while the electronic device 100 is substantially stationary, while another defines function convention to be a decreasing volume with an object rotation direction 304 that is clockwise while the electronic device 100 is substantially stationary, and so forth.

In one or more embodiments, an axial object rotation amount 311 can be determined in addition to the object rotation direction 304. The axial object rotation amount 311 represents an angular displacement or magnitude of the rotation 303 of the finger 201 on the contact surface of the fingerprint sensor. In one or more embodiments, this axial object rotation amount 311 can be used to control an extent of the control operation performed.

Again using volume adjustment as the illustrative control operation 305, in one or more embodiments the control operation 305 comprises a control magnitude 312. The control magnitude 312 defines the extent to which the control operation 305 will be performed. In one or more embodiments, the control magnitude 312 is a function of the axial object rotation amount 311 occurring while the electronic device 100 is substantially stationary. Thus if, in this example, the axial object rotation amount 311 of the finger 201 is twenty degrees while the electronic device 100 is substantially stationary, with the object rotation direction 304 occurring in the clockwise direction, the one or more processors (116) will increase the volume of the audio output device (131) less than if the axial object rotation amount 311 of the finger 201 was forty degrees in the clockwise direction while the electronic device 100 is substantially stationary.

In one or more embodiments, an object rotation velocity 313 can be determined in addition to the axial object rotation amount 311 and the object rotation direction 304. The object rotation velocity 313 represents an angular velocity or speed of the rotation 303 of the finger 201 on the contact surface of the fingerprint sensor 110. In one or more embodiments, this object rotation velocity 313 can be used to control an extent of the control operation performed.

Again using volume adjustment as the illustrative control operation 305, in one or more embodiments the control operation 305 comprises a control velocity 314. The control velocity 314 can define the speed with which the control operation 305 will be performed.

In one or more embodiments, the control magnitude 312 or the control velocity 314 is a function of the object rotation velocity 313. Thus, where the control velocity 314 defines the extent to which the control operation 305 will be performed, and in this example the control velocity 314 of the finger 201 is two rotations per minute while the electronic device 100 is substantially stationary, with the object rotation direction 304 occurring in the clockwise direction, the one or more processors (116) will increase the volume of the audio output device (131) less than if the control velocity 314 of the finger 201 was four rotations per minute in the clockwise direction while the electronic device 100 is substantially stationary.

Where the control velocity 314 defines the speed with which the control operation 308 will be performed, and the control operation 308 is a scrolling operation of a graphical user interface, the one or more processors (116) may cause the graphical user interface to scroll more quickly when the finger 201 is rotating at six revolutions per minute while the electronic device 100 is substantially stationary than if it were rotating at three revolutions per minute while the electronic device 100 is substantially stationary. Thus, if scrolling through images in a gallery, rotation 303 of the finger 201 at a faster rate while the electronic device 100 is substantially stationary would cause the images to pass by at a faster clip, and so forth. It should be noted that the control operation can be a function of any of the object rotation direction 304, the control velocity 314, or the axial object rotation amount 311 in any combination.

Figure 4:
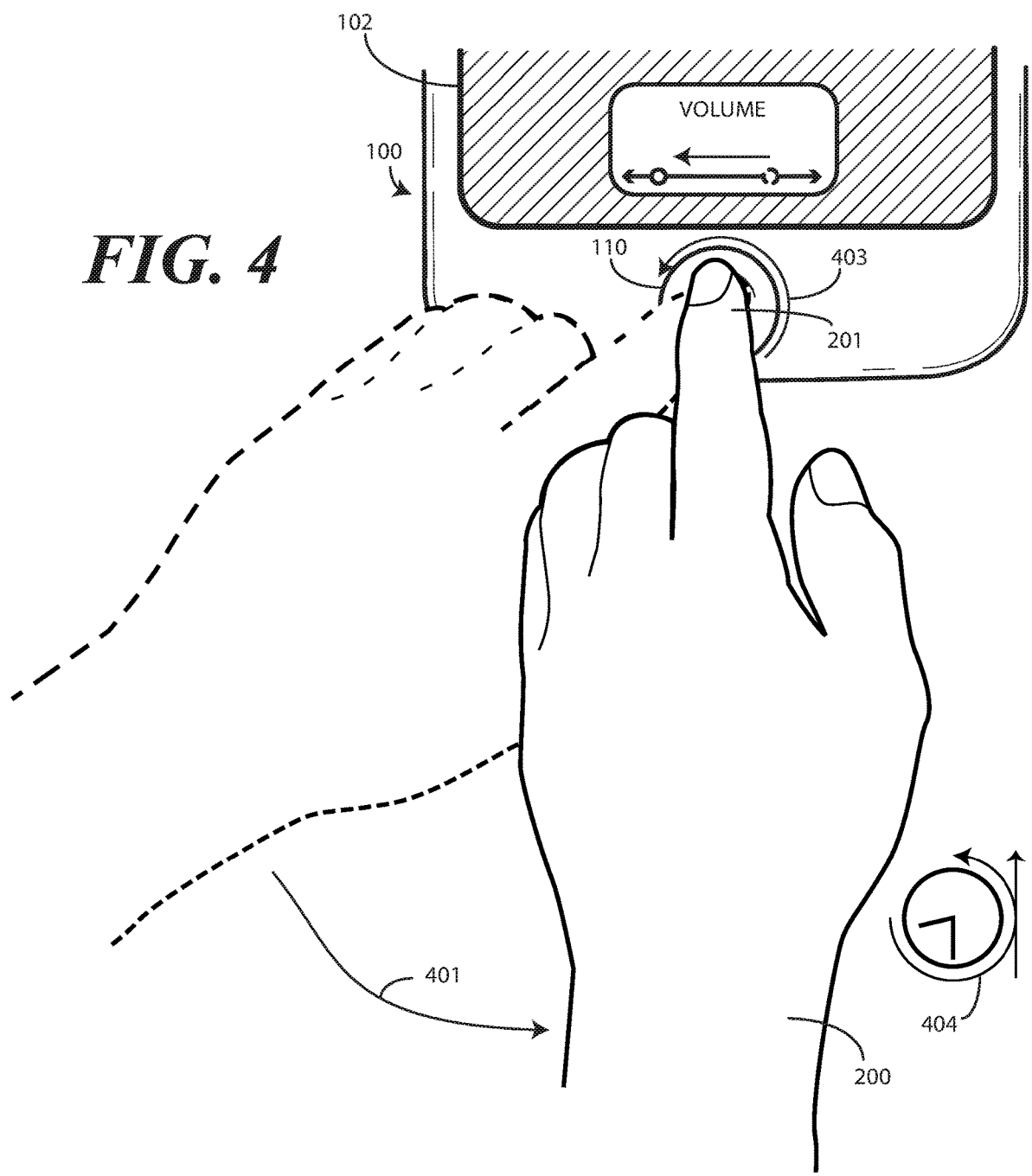
FIG. 4 illustrates one or more method steps in accordance with one or more embodiments of the disclosure.

Turning now to FIG. 4, illustrated therein are one or more method steps for performing the opposite control operation from that shown in FIG. 3. Thus, if the control operation from FIG. 3 was increasing the volume of an audio output device (131) of the electronic device 100, FIG. 4 illustrates decreasing the volume of an audio output device (131) of the electronic device 100 in accordance with the convention function of the control operation.

As shown in FIG. 4, the user 200 has placed the finger 201 on the contact surface of the fingerprint sensor 110 while the electronic device 100 is substantially stationary. The user then rotates 401 their hand 302 counterclockwise, which causes the finger 201 to rotate 403 counterclockwise across the contact surface of the fingerprint sensor 110 while the electronic device 100 is substantially stationary. As before, in one or more embodiments the fingerprint sensor 110 detects this rotation by capturing, with a plurality of sensors, a plurality of scans of the fingerprint pattern from the finger 201 as it rotates 403 while the electronic device 100 is substantially stationary. Alternatively, the fingerprint sensor 110 may capture one or more images of the finger 201 as it rotates 403 with the plurality of sensors while the electronic device 100 is substantially stationary.

In one or more embodiments, in addition to detecting the rotation 403 of the finger 201 while the electronic device 100 is substantially stationary, the fingerprint sensor 110 further detects an object rotation direction 404, which in this illustrative example is counterclockwise. The object rotation direction 404 defines an axial direction in which the finger 201 rotates 403. In this illustrative embodiment, the axial direction in which the finger 201 rotates 403 is opposite the axial direction of FIG. 3B.

Upon detecting that the finger 201 is rotating 403 while the electronic device 100 is substantially stationary, and the object rotation direction 404, in one or more embodiments the one or more processors (116) of the electronic device 100 can perform a control operation. As before, examples of control operations comprise increasing or decreasing a volume of an audio output device (131) of the electronic device 100, such as a loudspeaker. Alternatively, other control operations can be performed as well, with the control operation being performed being defined by the user 200 in the settings of the electronic device 100. Examples of such control operations include increasing or decreasing an illumination level of a visual output device (132) of the electronic device 100, controlling a cursor presented on the display 102, panning through data presented on a display 102 of the electronic device 100, adjusting a tone control of an audio output device (131) of the electronic device 100, performing a zoom operation on the data presented on the display 102 of the electronic device 100, or performing a zoom operation for an imager. Other control operations will be obvious to those of ordinary skill in the art having the benefit of this disclosure.

As before, the control operation can be selected as a function of the object rotation direction 404. Since the control operation can be one of two control operations, in one or more embodiments the control operation selected is selected with a function convention that corresponds to the object rotation direction 404 while the electronic device 100 is substantially stationary. In this example, the one or more processors (116) of the electronic device 100 will select a second control operation, different from the first control operation of FIGS. 3A-3B, which is decreasing the volume of the audio output device (131) of the electronic device 100 due to the fact that the object rotation direction 404 is counter clockwise while the electronic device 100 is substantially stationary. The one or more processors (116) of the electronic device 100 can then perform the second control operation based upon the object rotation direction 404 being counterclockwise while the electronic device 100 is substantially stationary. In this illustration, the second control operation comprises decreasing the volume of the audio output device (131) of the electronic device 100 when the object rotation direction 404 is counterclockwise.

As before, an axial object rotation amount (311) or object rotation velocity (313) can be determined in addition to the object rotation direction 404. In one or more embodiments, the axial object rotation amount (311) can be used to control an extent of the control operation performed. In one or more embodiments, the object rotation velocity (313) can be used to control an extent of the control operation performed. In one or more embodiments, the control magnitude (312) or the control velocity (314) is a function of the object rotation velocity (313). As before, the control operation can be a function of any of the object rotation direction 404, the control velocity (314), or the axial object rotation amount (311) in any combination.

Thus, as shown in FIGS. 3A-3B and 4, embodiments of the disclosure provide methods and systems for detecting, with a fingerprint sensor 110 of an electronic device 100, rotation of an object, such as a user's finger 201, when in contact with the fingerprint sensor 110 while the electronic device 100 is substantially stationary. In one or more embodiments, in addition to detecting that the object is rotating, the methods and systems detect an object rotation direction 304,404 while the electronic device 100 is substantially stationary. In one or more embodiments, the methods and systems then select, with one or more processors (116) of the electronic device 100, a control operation as a function of the object rotation direction 304,404 while the electronic device 100 is substantially stationary.

Examples of control operations include increase a volume of an audio output device (131), decreasing the volume of the audio output device (131), increasing an illumination level of a display or other visual output device (132), decreasing the illumination level of the display or other visual output device (132), adjusting a tone control of the audio output device (131), adjusting a panning control of a camera of the electronic device 100, adjusting a zooming control of the camera of the electronic device 100, or adjusting a scrolling control of a graphical user interface of the electronic device 100. These examples of control operations are illustrative only, as numerous others will be obvious to those of ordinary skill in the art having the benefit of this disclosure. Once the control operation is selected, in one or more embodiments the one or more processors (116) then perform either the first control operation or the second control operation based upon whether the object rotation direction 304 was clockwise or counterclockwise.

In addition to object rotation direction, the control operation performed can further be a function of the axial displacement and rotation speed of the object contacting the fingerprint sensor 110. Advantageously, embodiments of the disclosure provide for an intuitive, simple method for performing a control operation obviates the need for any protruding buttons along the electronic device 100.

As noted above, embodiments of the disclosure contemplate that the action of an object rotating while in contact with the fingerprint sensor 110 can occur as a result of at least two different situations. In a first instance, shown above with reference to FIGS. 3A-3B and 4, the electronic device 100 may be substantially stationary while the finger 201 is rotating and in contact with the fingerprint sensor 110. In a second instance, the finger 201 may be substantially stationary while the user rotates the electronic device 100 to create the "rotation" perceived by the fingerprint sensor 110. In this latter instance, the convention for selecting the control operation becomes the opposite. To wit, rather than selecting a first control operation when the electronic device 100 is substantially stationary and the object rotation direction is clockwise, a second control operation will be selected when the electronic device is rotating and the object rotation direction is clockwise. This will be described in more detail below with reference to FIGS. 5A-6B.

Figure 5A:
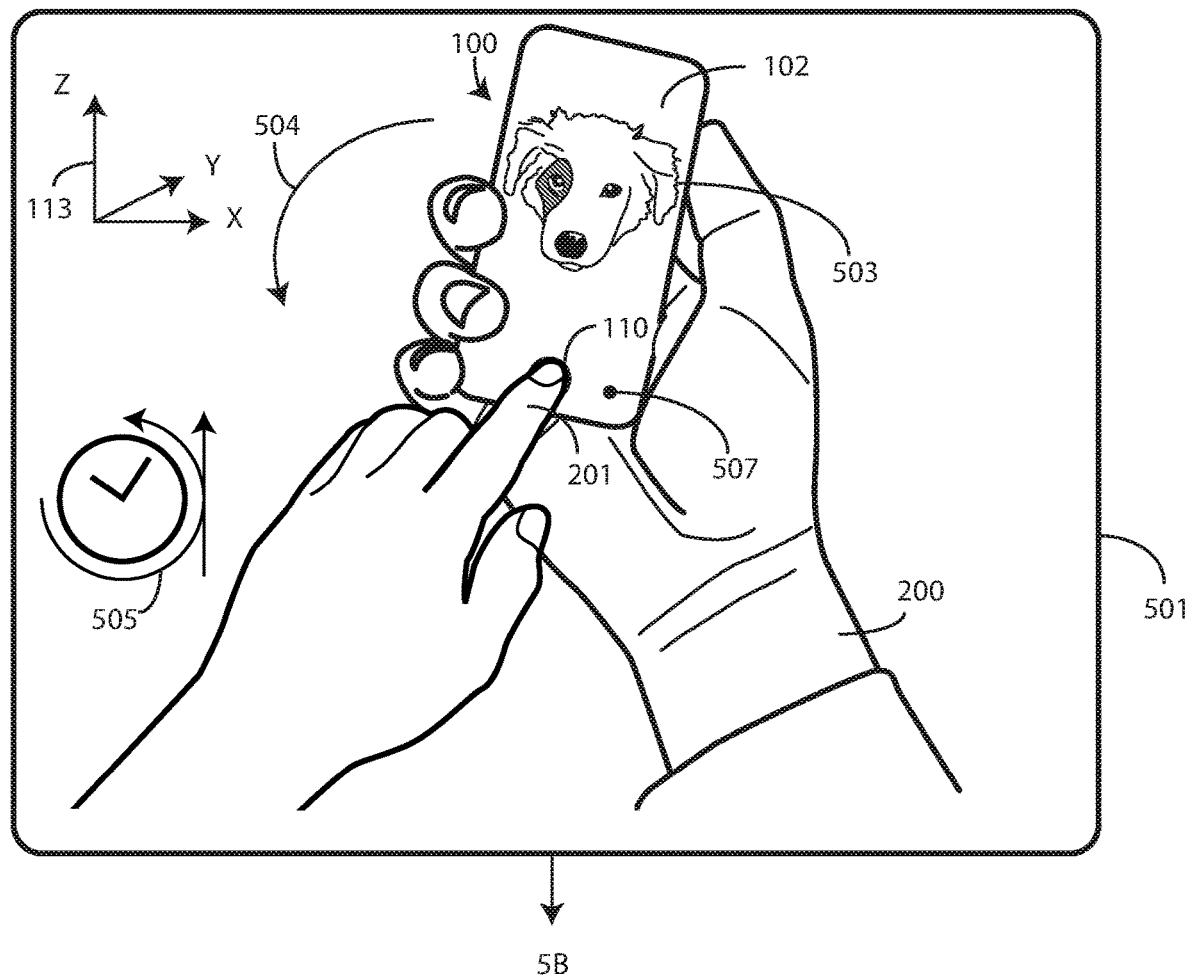
FIGS. 5A-5B illustrate one or more method steps in accordance with one or more embodiments of the disclosure.
Figure 5B:
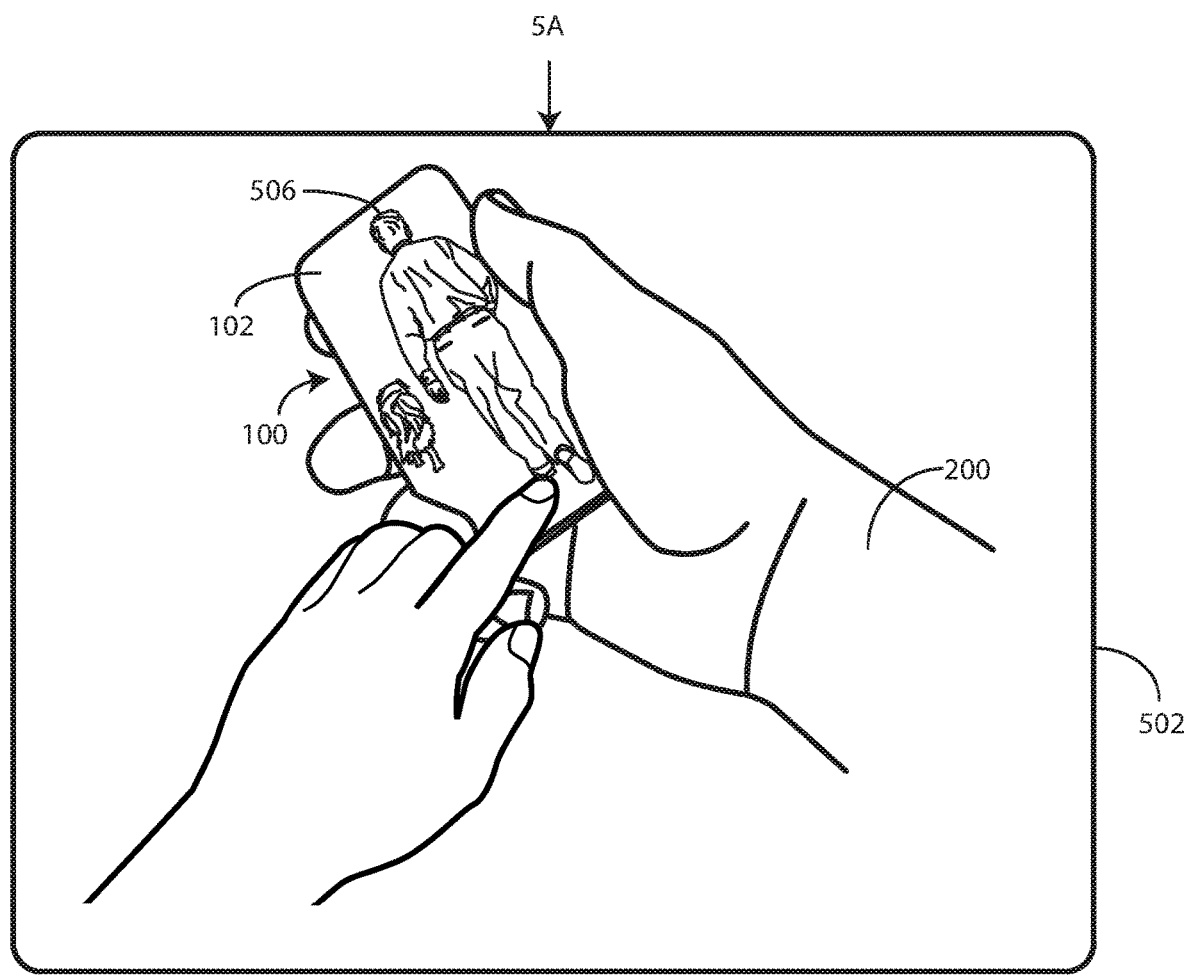

Turning now to FIGS. 5A-5B, illustrated therein are one or more method steps for performing a control operation by rotating the electronic device 100 while the finger 201 is substantially stationary, but where the electronic device 100 is rotating about an axis 507 passing through the electronic device 100. In one embodiment, the axis 507 passes through a major face of the electronic device 100, such as that defined by the display 102 in FIG. 5A. In some embodiments, the axis will pass through the finger 201 and the fingerprint sensor 110, as did the axis (111) of FIG. 1A. In other embodiments, the axis 507 will be offset from the fingerprint sensor 110. Having the axis pass through the electronic device 100, and optionally through the fingerprint sensor 110 and the finger 201 prevents control operations from occurring, for example, when the user is turning around (in that situation the axis of rotation of the electronic device 100 would be separated from the electronic device 100 and would not pass therethrough).

As shown at step 501, the user 200 has placed the finger 201 on the contact surface of the fingerprint sensor 110. The user is looking at a picture 503 of his dog, Buster, on the display 102 of the electronic device 100. The picture 503 is one of many pictures in a photo gallery stored in the memory (118) of the electronic device.

The user 200 wants to move to the previous picture of the photo gallery. In this embodiment, rather than rotating the finger 201 about an axis (111) normal to the contact surface of the fingerprint sensor 110, the user instead rotates 504 the electronic device 100 about an axis 507 normal to, and passing through, a major face of the electronic device 100 while holding the finger 201 in a substantially stationary state. In this embodiment, the user rotates 504 the hand holding the electronic device 100 counterclockwise about the axis 507. This rotation 504 of the electronic device 100 causes the finger 201 to rotate on the fingerprint sensor in the opposite direction, i.e., clockwise. As before, in one or more embodiments the fingerprint sensor 110 detects this rotation by capturing, with a plurality of sensors, a plurality of scans of the fingerprint pattern from the finger 201 as the electronic device 100 rotates 504. Alternatively, the fingerprint sensor 110 may capture one or more images of the finger 201 as the electronic device 100 rotates 504 with the plurality of sensors.

In one or more embodiments, in addition to detecting the rotation of the finger 201 due to the rotation 504 of the electronic device 100, the fingerprint sensor 110 further detects an object rotation direction, which in this illustrative example is clockwise. The object rotation direction defines an axial direction in which the finger 201 rotates on the fingerprint sensor 110.

In one or more embodiments, in addition to monitoring rotation of the finger 201 on the fingerprint sensor 110, one or more motion detectors (114) of the electronic device 100 determine whether the electronic device 100 is rotating in three-dimensional space 113, as is the case at step 501. Where the electronic device 100 is rotating, the one or more motion detectors (114) are further operable to detect an electronic device rotation direction 505, which in this case is counterclockwise.

In one or more embodiments, upon detecting that the finger 201 is rotating clockwise, but that the electronic device rotation direction 505 is counterclockwise, the one or more processors (116) of the electronic device 100 can perform a control operation. As before, examples of control operations comprise increasing or decreasing a volume of an audio output device (131) of the electronic device 100, such as a loudspeaker, increasing or decreasing an illumination level of a visual output device (132) of the electronic device 100, controlling a cursor presented on the display 102, panning through data presented on a display 102 of the electronic device 100, adjusting a tone control of an audio output device (131) of the electronic device 100, performing a zoom operation on the data presented on the display 102 of the electronic device 100, or performing a zoom operation for an imager. In this illustrative embodiment, the control operation is panning through data presented on a display 102 of the electronic device 100, namely the pictures of the gallery.

In one or more embodiments, the one or more processors (116) will select the second control operation, which is panning backward through the pictures in the gallery, when the rotation of the finger 201 is clockwise and the electronic device rotation direction 505 is counter clockwise. Accordingly, as shown at step 502, a previous picture 506 of Buster and the user 200 is now presented on the display 102.

Accordingly, in this embodiment the control operation is selected as a function of both the object rotation direction (clockwise for the finger) and the electronic device rotation direction 505. Since the control operation can be one of two control operations, in one or more embodiments a second control operation is selected when either the object rotation direction is counterclockwise and the electronic device is substantially stationary (FIG. 4), or the object rotation is clockwise and the electronic device rotation direction 505 is counterclockwise (FIGS. 5A-5B).

By contrast, the one or more processors (116) can select the first control function when the object rotation direction is clockwise and the electronic device is substantially stationary (FIG. 3), or where the object rotation direction is counterclockwise and the electronic device rotation direction 505 is clockwise, as will be described below with reference to FIGS. 6A-6B.

As before, in addition to detecting rotation 504 of the electronic device 100 and the electronic device rotation direction 505, an axial object rotation amount or object rotation velocity for one or both of the electronic device 100 or the finger 201 can be determined. In one or more embodiments, the axial object rotation amount for one or both of the electronic device 100 or the finger 201 can be used to control an extent of the control operation performed. In one or more embodiments, the object rotation velocity for one or both of the electronic device 100 or the finger 201 can be used to control an extent of the control operation performed. In one or more embodiments, the control magnitude or the control velocity is a function of the object rotation velocity for one or both of the electronic device 100 or the finger 201. As before, the control operation can be a function of any of the object rotation direction, the electronic device rotation direction 505, the control velocity for one or both of the electronic device 100 or the finger 201, or the axial object rotation for one or both of the electronic device 100 or the finger 201, amount in any combination.

Figure 6A:
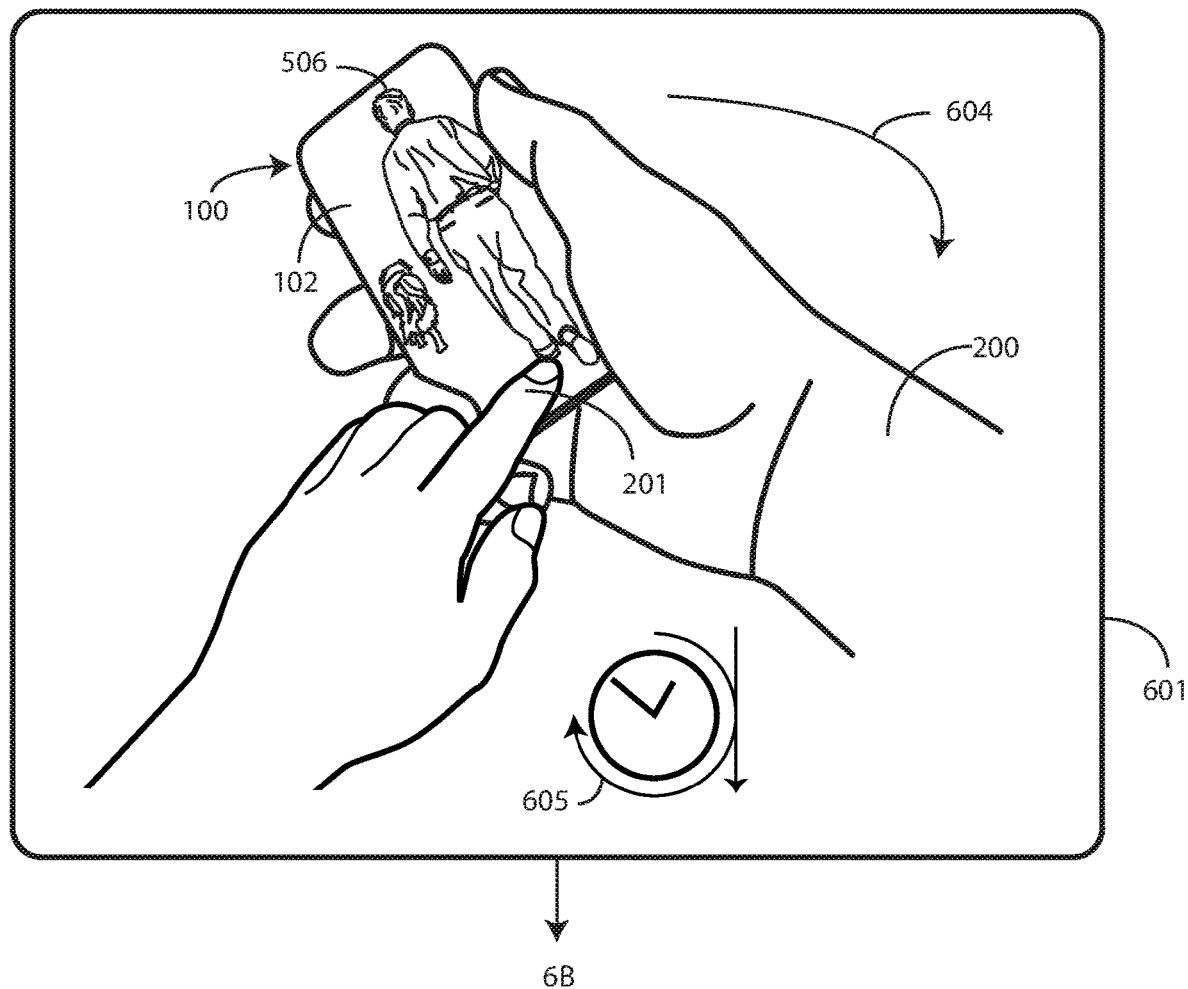
FIGS. 6A-6B illustrate one or more method steps in accordance with one or more embodiments of the disclosure.
Figure 6B:
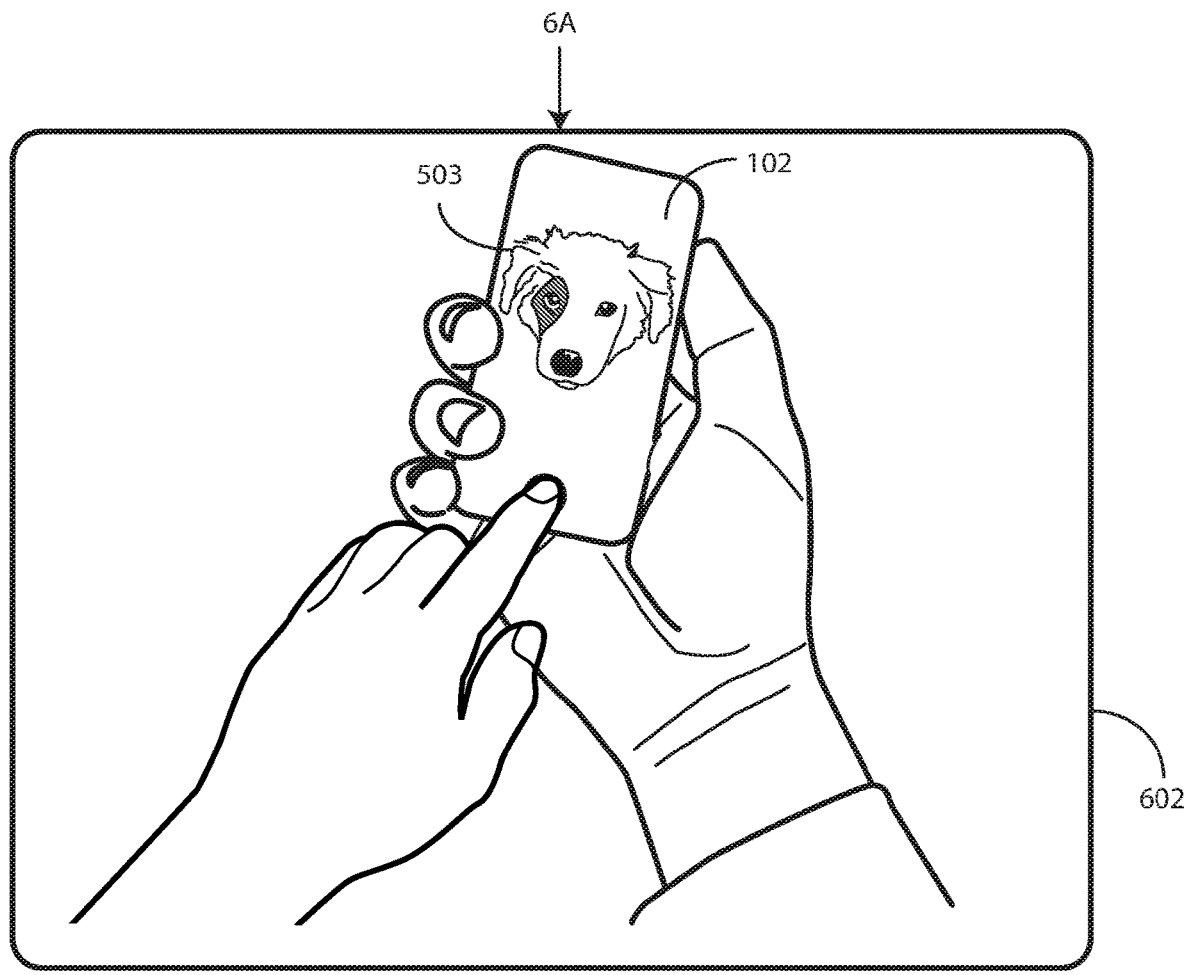

Turning now to FIGS. 6A-6B, illustrated therein are one or more method steps for performing the first control operation that is the corollary to the second control operation occurring in FIGS. 5A-5B by rotating the electronic device 100 while the finger 201 is substantially stationary. As shown at step 601, the user 200 has placed the finger 201 on the contact surface of the fingerprint sensor 110. The user is looking at a picture 506 of the user 200 and his dog, Buster, on the display 102 of the electronic device 100. Continuing the example from FIGS. 5A-5B, in this illustration the picture 506 is one of many pictures in a photo gallery stored in the memory (118) of the electronic device 100.

The user 200 wants to move to the subsequent picture of the photo gallery. In this embodiment, rather than rotating the finger 201 about an axis normal to the contact surface of the fingerprint sensor 110, the user instead rotates 604 the electronic device 100 while holding the finger 201 stationary. In this embodiment, the user rotates 604 the hand holding the electronic device 100 clockwise. This rotation 604 of the electronic device 100 causes the finger 201 to rotate on the fingerprint sensor 110 in the opposite direction, i.e., counterclockwise. In addition to detecting the rotation of the finger 201 due to the rotation 504 of the electronic device 100, the fingerprint sensor 110 further detects an object rotation direction, which in this illustrative example is counterclockwise. The object rotation direction defines an axial direction in which the finger 201 rotates on the fingerprint sensor 110.

In one or more embodiments, in addition to monitoring rotation of the finger 201 on the fingerprint sensor 110, one or more motion detectors (114) of the electronic device 100 determine whether the electronic device 100 is rotating in three-dimensional space (113), as is the case at step 601. Where the electronic device 100 is rotating, the one or more motion detectors (114) are further operable to detect an electronic device rotation direction 605, which in this case is clockwise.

Upon detecting that the finger 201 is rotating counterclockwise, but that the electronic device rotation direction 605 is clockwise, the one or more processors (116) of the electronic device 100 can select and perform the first control operation. In this illustrative embodiment, the first control operation is panning forward through data presented on a display 102 of the electronic device 100, namely the pictures of the gallery.

In one or more embodiments, the one or more processors (116) will select a first control operation, which is panning forward through the pictures in the gallery, when the rotation of the finger 201 is counterclockwise and the electronic device rotation direction 605 is clockwise. Accordingly, as shown at step 602, the subsequent, or second, picture 503 of Buster is again presented on the display 102.

As before, in addition to detecting rotation 604 of the electronic device 100 and the electronic device rotation direction 605, an axial object rotation amount or object rotation velocity for one or both of the electronic device 100 or the finger 201 can be determined. In one or more embodiments, the axial object rotation amount for one or both of the electronic device 100 or the finger 201 can be used to control an extent of the control operation performed. In one or more embodiments, the object rotation velocity for one or both of the electronic device 100 or the finger 201 can be used to control an extent of the control operation performed. In one or more embodiments, the control magnitude or the control velocity is a function of the object rotation velocity for one or both of the electronic device 100 or the finger 201. As before, the control operation can be a function of any of the object rotation direction, the electronic device rotation direction 605, the control velocity for one or both of the electronic device 100 or the finger 201, or the axial object rotation for one or both of the electronic device 100 or the finger 201, amount in any combination.

Advantageously, embodiments of the disclosure allow the selection of a first control operation, e.g., increasing a volume of an audio output device or panning forward through pictures in a photo gallery, by holding the electronic device 100 in a substantially stationary or stationary state, and rotating a finger 201 on a fingerprint sensor (110) in a first direction, e.g., a clockwise direction (FIG. 3B). By contrast, a second control operation can be selected by holding the electronic device 100 in a substantially stationary or stationary state and rotating a finger 201 on the fingerprint sensor (110) in a second direction that is different from the first direction, e.g., a counterclockwise direction (FIG. 4). As described above with reference to FIGS. 3A-3B and 4, this mode of operation allows a user 200, for example, to rotate a finger 201 on the fingerprint sensor (110) as if the fingerprint sensor (110) was a tiny adjustment or control knob.

However, when the finger 201 remains stationary, and the electronic device 100 is rotated, the convention detected by the fingerprint sensor (110) changes, thereby allowing the user 200 to use the entire electronic device 100 as a large adjustment or control knob. As shown and described in FIGS. 5A-5B, when the user 200 places a finger 201 on the fingerprint sensor (110) and holds it so as to be substantially stationary, but then rotates the electronic device 100 to the left, i.e., counterclockwise, fingerprint sensor (110) will sense the object rotation direction to be clockwise. However, the one or more motion detectors (114) detect that the electronic device 100 is not substantially stationary in three-dimensional space, and is rather rotating in a direction opposite the finger, namely, clockwise. Accordingly, rather than selecting the first control operation when the object rotation direction is clockwise and the electronic device 100 is substantially stationary, the second control operation will be selected due to the fact that the electronic device rotation direction is opposite the object rotation direction.

Accordingly, assuming a clockwise rotation increasing function convention, and using embodiments of the disclosure where the first control operation is increasing a volume of an audio output device of the electronic device or panning forward through pictures in a gallery, and the second control operation is decreasing the volume of the audio output device or panning backward through pictures in a gallery, the user 200 can advantageously increase the volume or pan forward in one of two ways: First, the user 200 can rotate the finger 201 on the fingerprint sensor (110) in a clockwise direction while the electronic device 100 is substantially stationary (FIGS. 3A-3B), thereby using the fingerprint sensor (110) like a tiny knob. Second, the user 200 can hold their finger 201 in a substantially stationary state on the fingerprint sensor (110) and rotate the electronic device 100 in a clockwise direction (FIGS. 6A-6B). While the fingerprint sensor (110) determines that the object rotation direction is counterclockwise, the volume will still increase, or the panning will continue forward, due to the fact that the electronic device 100 is being used as a giant "knob" in accordance with the clockwise rotation increasing function convention.

Similarly, the user 200 could decrease the volume or pan backward through the gallery in one of two ways: First, the user 200 could rotate the finger 201 on the fingerprint sensor (110) in a counterclockwise direction while the electronic device 100 is substantially stationary (FIG. 4), thereby using the fingerprint sensor (110) like a tiny knob in the other direction. Second, the user 200 could hold their finger 201 in a substantially stationary state on the fingerprint sensor (110) and rotate the electronic device 110 in a counterclockwise direction (FIGS. 5A-5B). While the fingerprint sensor (110) determines that the object rotation direction is clockwise, the volume will still decrease, or the panning will still go backward, due to the fact that the electronic device 100 is being used as a giant "knob" in the other direction in accordance with the clockwise rotation increasing function convention.

Figure 7:
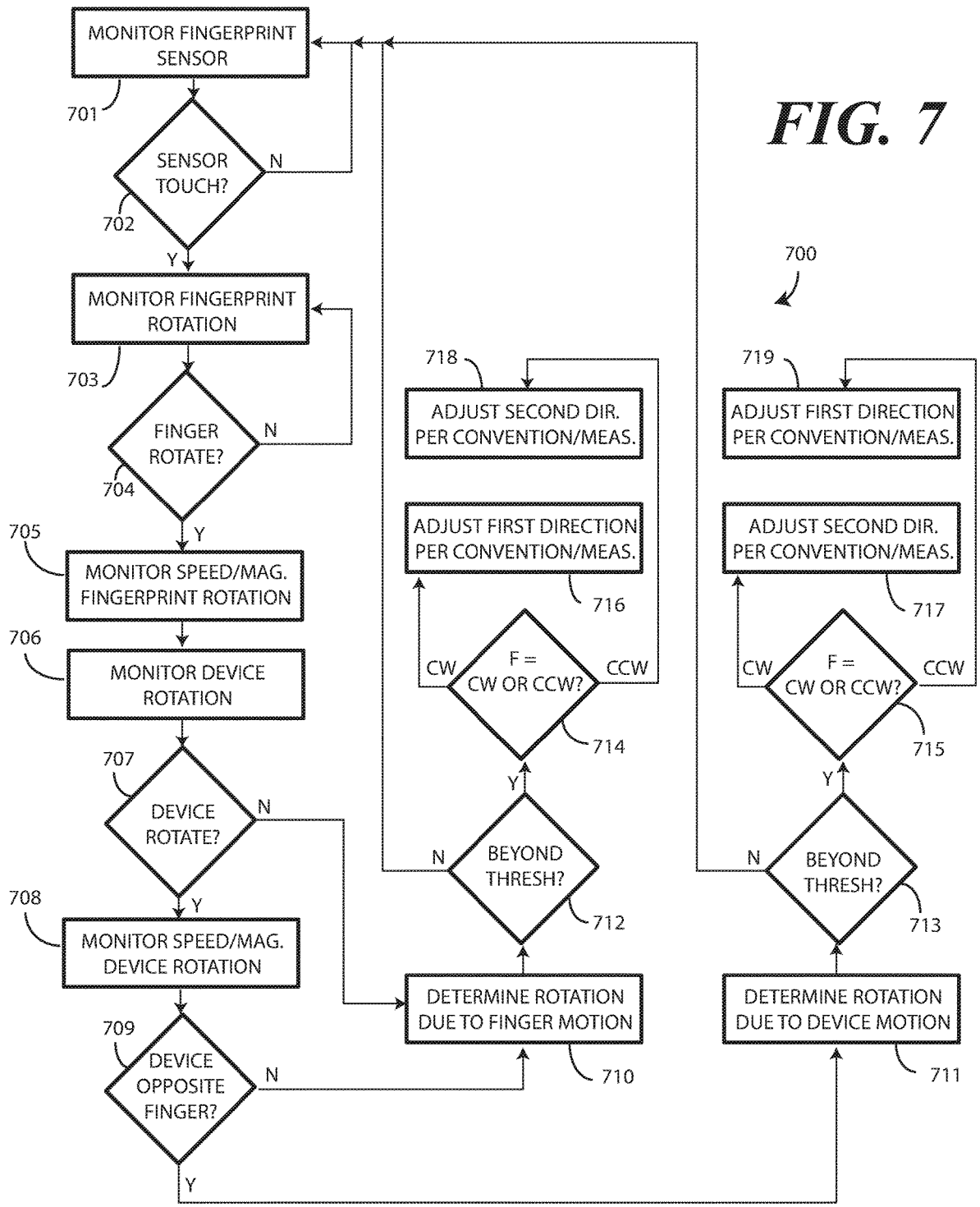
FIG. 7 illustrates one or more method steps in accordance with one or more embodiments of the disclosure.

Turning now to FIG. 7, illustrated therein is a general method 700 that covers the various scenarios described above with reference to FIGS. 3-6. Beginning at step 701, the method 700 monitors a fingerprint sensor of an electronic device. In one or more embodiments, step 701 comprises capturing, with a plurality of sensors, a plurality of scans of the contact surface of the fingerprint sensor. Alternatively, step 701 can include capturing one or more images of the contact surface of the fingerprint sensor with the plurality of sensors. Whether an object is in contact with the fingerprint sensor is determined at decision 702.

At step 703, the method 700 monitors the fingerprint sensor for rotation of an object contacting the fingerprint sensor. Whether this rotation occurs is determined at decision 704. Step 703 can further comprise determining an object rotation direction or an axial direction of rotation of the rotating object.

At step 705, the method 700 optionally determines an object rotation velocity for the object rotating on the fingerprint sensor. At step 705, the method 700 may also optionally determine an axial object rotation amount the object rotates on the fingerprint sensor. As such, step 705 can comprise determining one or more of the velocity of rotation of the object and/or the axial amount of rotation for the object.

At step 706, the method 700 monitors, with one or more motion detectors, whether the electronic device is rotating in three-dimensional space. Whether it is rotating is determined at decision 707. Step 706 can further comprise determining an electronic device rotation direction or an axial direction of rotation of the electronic device.

At step 708, the method 700 optionally determines an object rotation velocity for the electronic device in three-dimensional space. At step 708, the method 700 may also optionally determine an axial object rotation amount the electronic device rotates in three-dimensional space. As such, step 708 can comprise determining one or more of the velocity of rotation of the electronic device and/or the axial amount of rotation for the electronic device.

From the above steps, one of three different situations can occur. In a first instance the electronic device may be stationary while the finger is rotating and in contact with the fingerprint sensor. In a second instance, the finger may be stationary while the user rotates the electronic device to create the "rotation" perceived by the fingerprint sensor.

In a third instance, the electronic device and finger can both be rotating. In this third instance, the electronic device and finger can be rotating in opposite directions. Alternatively, the electronic device and finger can be rotating in the same directions. Also, in this third instance the electronic device can be rotating faster than the finger rotates. Alternatively, the finger can be rotating faster than the electronic device rotates.

In the third instance, in one or more embodiments the one or more processors determine which is greater in magnitude, the rotation of the object on the fingerprint sensor or the rotation of the electronic device. In one or more embodiments, the greater magnitude rotation will control. Consequently, if the finger is rotating faster than the electronic device, the electronic device will be treated as being substantially stationary in one or more embodiments. Where the electronic device is rotating faster than the finger, the finger will be treated as being substantially stationary in one or more embodiments.

Whether the device and finger are rotating in opposite directions is determined at decision 709. Where the device and finger are rotating in opposite directions, the method 700 moves step 711. Where the electronic device is stationary while the finger is rotating, the method 700 moves to step 710.

Starting from step 710, optional decision 712 can determine whether the detected rotation is above a predefined threshold. For example, a user-definable setting may require some minimum rotation amount prior to performing a control operation to prevent nuisance tripping of the feature.

At decision 714, a determination is made whether the object rotation direction is clockwise or counter clockwise while the electronic device is stationary. Where clockwise while the electronic device is stationary, the method 700 moves to step 716 where a control operation adjusting the electronic device in accordance with a first direction convention is selected and performed. Where counterclockwise while the electronic device is stationary, the method 700 moves to step 718 where a control operation adjusting the electronic device in accordance with a second direction convention is selected and performed. Step 716 may increase the volume of an audio output device, while step 718 decreases the volume of the output of the electronic device, and so forth.

Starting from step 711, optional decision 713 can determine whether the detected rotation is above a predefined threshold. At decision 715, a determination is made whether the object rotation direction is clockwise or counter clockwise while the electronic device rotates with the finger remaining stationary. Where the object rotation direction is clockwise due to the electronic device rotating while the finger is stationary, the method 700 moves to step 717 where a control operation adjusting the electronic device in accordance with a second direction convention is selected and performed. Where the object rotation direction is counterclockwise due to the electronic device rotating while the finger is stationary, the method 700 moves to step 719 where a control operation adjusting the electronic device in accordance with a first direction convention is selected and performed. Step 717 may decrease the volume of an audio output device, while step 719 increases the volume of the output of the electronic device, and so forth.

A method in an electronic device comprises detecting, with a fingerprint sensor, rotation of an object contacting the fingerprint sensor. Where the object is rotating, an object rotation direction is also detected.

The method comprises determining, with one or more motion detectors, whether the electronic device is rotating in three-dimensional space. The method selects, with one or more processors operable with the fingerprint sensor and the one or more motion detectors a first control operation for the electronic device when the electronic device is stationary and the object rotation direction is clockwise. Alternatively, the method selects a second control operation, which is different from the first control operation, when the electronic device is rotating and the object rotation direction is clockwise. The method performs, with the one or more processors, either the first control operation or the second control operation.

The method further determines, with the one or more motion detectors when the electronic device is rotating, an electronic device rotation direction. The selecting comprises selecting the second control operation only when the object rotation direction is opposite the electronic device rotation direction.

The method further comprises also selecting, with the one or more processors, the first control operation when the electronic device is rotating and the object rotation direction is counterclockwise. Alternatively, the method further comprises selecting the second control operation when the electronic device is stationary and the object rotation direction is counterclockwise.

The method further determines, with the one or more motion detectors when the electronic device is rotating, an electronic device rotation direction. The selecting comprises selecting the first control operation only when the object rotation direction is opposite the electronic device rotation direction.

The first control operation comprises increasing a volume of an audio output of the electronic device. The first control operation comprises increasing an illumination level of a visual output of the electronic device. The first control operation comprises a directional scrolling operation advancing objects presented on a visual output of the electronic device.

The method further comprises determining an object rotation velocity for the object rotating on the fingerprint sensor. One or both of the first control operation or the second control operation have associated therewith a control magnitude. The control magnitude is a function of the object rotation velocity.

The method further comprises determining an axial object rotation amount the object rotates on the fingerprint sensor. One or both of the first control operation or the second control operation have associated therewith a control magnitude. The control magnitude is a function of the axial object rotation amount.

An electronic device comprises a fingerprint sensor. The electronic device comprises one or more motion detectors. The electronic device comprises one or more processors operable with the fingerprint sensor and the one or more motion detectors.

The one or more processors determine, with the fingerprint sensor, a direction of rotation of an object rotating on, and in contact with, the fingerprint sensor. The one or more processors further determine, with the one or more motion detectors, whether the electronic device is rotating in three-dimensional space. Where the electronic device is rotating, the one or more processors determined another direction of rotation of the electronic device.

The one or more processors select and perform a first control operation when the object is rotating in a first axial direction and the electronic device is substantially stationary. Alternatively, the one or more processors select and perform a second control operation when the object is rotating in the first axial direction while the electronic device is rotating in a second axial direction. The second axial direction is opposite the first axial direction.

The one or more processors can select and perform the first control operation when the object is rotating in the second axial direction and while the electronic device is rotating in the first axial direction. The one or more processors can select and perform the second control operation when the object is rotating in the second axial direction while the electronic device is substantially stationary.

The electronic device further comprises an audio output device. The first axial direction comprises a clockwise direction. The first control operation comprises increasing a volume of the audio output device, while the second control operation comprises decreasing the volume of the audio output device.

The electronic device further comprises a visual output. The first axial direction comprises a clockwise direction. The first control operation comprises increasing an illumination level of a visual output of the electronic device, while the second control operation comprises decreasing the illumination level of the visual output of the electronic device.

The one or more processors further determine, with the fingerprint sensor, a velocity of rotation for the object. At least the first control operation has associated therewith a control magnitude that is a function of the velocity of rotation.

The one or more processors further determine, with the fingerprint sensor, an axial amount of rotation for the object. At least the first control operation has associated therewith a control magnitude that is a function of the axial amount of rotation.

A method in an electronic device comprises detecting, with a fingerprint sensor, rotation of an object contacting the fingerprint sensor and, where the object is rotating, an object rotation direction. The method comprises determining, with one or more motion detectors, whether the electronic device is rotating in three-dimensional space and, where the electronic device is rotating, an electronic device rotation direction.

The method comprises selecting, with one or more processors operable with the fingerprint sensor and the one or more motion detectors, a first control operation for the electronic device when the object rotation direction is clockwise and the electronic device is substantially stationary. Alternatively, the first control operation can be selected when the object rotation direction is counterclockwise and the electronic device rotation direction is clockwise.

The method further comprises selecting, with the one or more processors, a second control operation that is different from the first control operation when the object rotation direction is counterclockwise and the electronic device is substantially stationary. The method further comprises selecting the second control operation when the object rotation direction is clockwise and the electronic device rotation direction is counterclockwise. The first control operation comprises one of a volume control operation, an illumination control operation, or a directional scrolling operation.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, in another embodiment an electronic device may not include a motion detector at all. Instead, instructional prompts may be placed on the display asking the user to either rotate the finger on the fingerprint sensor, or alternatively, to rotate the electronic device. Such an electronic device would presume to know whether the electronic device was rotating based upon the prompt. With this in mind, the electronic device would know to expect a clockwise motion, in a clockwise increasing convention function, when prompting the user to rotate the finger to increase, for example, the volume. By contrast, the electronic device would know to expect a counterclockwise motion, in a clockwise increasing convention function, when prompting the user to rotate the electronic device while holding the finger stationary, to increase the same volume.

As such, even without a motion detector, but with clever instructional prompting on a user interface, the electronic device could select a first control operation for the electronic device when the electronic device is stationary and the object rotation direction is clockwise by prompting the user to hold the device stationary and rotate the finger. Alternatively, the electronic device could select a second control operation, different from the first control operation, when the electronic device is rotating and the object rotation direction is clockwise by prompting the user to hold their finger stationary and rotate the electronic device. In either situation, the electronic device could then perform either the first control operation or the second control operation based upon the prompt and received user input.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with a fingerprint sensor, rotation of an object contacting the fingerprint sensor and, where the object is rotating, an object rotation direction;
    determining an axial object rotation amount the object rotates on the fingerprint sensor;
    selecting, with one or more processors operable with the fingerprint sensor:
        a first control operation for the electronic device when the electronic device is stationary and the object rotation direction is clockwise; or
        a second control operation, different from the first control operation, when the electronic device is rotating and the object rotation direction is clockwise; and performing, with the one or more processors, either the first control operation or the second control operation; and further comprising also selecting, with the one or more processors:
the first control operation when the electronic device is rotating and the object rotation direction is counterclockwise; or
the second control operation when the electronic device is stationary and the object rotation direction is counterclockwise.

2. The method of claim 1, further comprising determining, with one or more motion detectors, whether the electronic device is rotating about an axis passing through the electronic device, and when the electronic device is rotating about the axis, an electronic device rotation direction, wherein the selecting comprises selecting the first control operation only when the object rotation direction is opposite the electronic device rotation direction.

3. The method of claim 1,
the first control operation comprises performing a zoom operation or
the second control operation comprises rotating content.

4. The method of claim 1, further comprising determining, with one or more motion detectors, whether the electronic device is rotating, and when the electronic device is rotating, an electronic device rotation direction, wherein the selecting the first control operation occurs only when the object rotation direction is opposite the electronic device rotation direction.

5. The method of claim 1, wherein the first control operation comprises increasing a volume of an audio output of the electronic device.

6. The method of claim 1, wherein the first control operation comprises increasing an illumination level of a visual output of the electronic device.

7. The method of claim 1, wherein the first control operation comprises a directional scrolling operation advancing objects presented on a visual output of the electronic device.

8. The method of claim 1, further comprising determining an object rotation velocity for the object rotating on the fingerprint sensor.

9. The method of claim 8, wherein one or both of the first control operation or the second control operation have associated therewith a control magnitude, wherein the control magnitude is a function of the object rotation velocity.

10. The method of claim 1, wherein the performing the either the first control operation or the second control operation occurs to an extent corresponding to the axial object rotation amount.

11. The method of claim 1, wherein one or both of the first control operation or the second control operation have associated therewith a control magnitude, wherein the control magnitude is a function of the axial object rotation amount.

12. An electronic device, comprising:
a fingerprint sensor;
one or more motion detectors; and
one or more processors operable with the fingerprint sensor and the one or more motion detectors;
the one or more processors determining, with the fingerprint sensor, a direction of rotation of an object rotating, and in contact with, the fingerprint sensor and a velocity of rotation for the object, and further determining, with the one or more motion detectors, whether the electronic device is rotating in three-dimensional space, and where the electronic device is rotating, another direction of rotation of the electronic device;
the one or more processors selecting and performing:
a first control operation when the object is rotating in a first axial direction and the electronic device is substantially stationary, wherein at least the first control operation has associated therewith a control magnitude that is a function of the velocity of rotation; or
a second control operation when the object is rotating in the first axial direction while the electronic device is rotating in a second axial direction, the second axial direction opposite the first axial direction; and
the one or more processors also selecting and performing:
the first control operation when the object is rotating in the second axial direction and while the electronic device is rotating in the first axial direction; or
the second control operation when the object is rotating in the second axial direction while the electronic device is substantially stationary.

13. The electronic device of claim 12, wherein
the first control operation comprises one of a volume control operation, an illumination control operation, a cursor control operation, a panning operation, a zoom operation, a content rotating operation, or an imager zoom operation or
the second control operation comprises another of the volume control operation, the illumination control operation, the cursor control operation, the panning operation, the zoom operation, the content rotating operation, or the imager zoom operation.

14. The electronic device of claim 12, further comprising an audio output device, the first axial direction comprising a clockwise direction, the first control operation comprising increasing a volume of the audio output device, the second control operation comprising decreasing the volume of the audio output device.

15. The electronic device of claim 14, wherein the second control operation has associated therewith another control magnitude that is a function of the velocity of rotation.

16. The electronic device of claim 14, the one or more processors further determining, with the fingerprint sensor, an axial amount of rotation for the object, wherein at least the first control operation has associated therewith a control magnitude that is a function of the axial amount of rotation.

17. The electronic device of claim 12, further comprising a visual output, the first axial direction comprising a clockwise direction, the first control operation comprising increasing an illumination level of a visual output of the electronic device, the second control operation comprising decreasing the illumination level of the visual output of the electronic device.

18. A method in an electronic device, the method comprising:
detecting, with a fingerprint sensor, rotation of an object contacting the fingerprint sensor and, where the object is rotating, an object rotation direction;
determining an object rotation velocity for the object rotating on the fingerprint sensor;
selecting, with one or more processors operable with the fingerprint sensor:
a first control operation for the electronic device when the electronic device is stationary and the object rotation direction is clockwise; or a second control operation, different from the first control operation, when the electronic device is rotating and the object rotation direction is clockwise; and performing, with the one or more processors, either the first control operation or the second control operation;

wherein one or both of the first control operation or the second control operation have associated therewith a control velocity defining a speed with which the one or both of the first control operation or the second control operation will be performed, wherein the control velocity is a function of the object rotation velocity.

19. The method of claim 18, wherein one or both of the first control operation or the second control operation comprises one of a volume control operation, an illumination control operation, a cursor control operation, a panning operation, a zoom operation, a content rotating operation, or an imager zoom operation.

20. The method of claim 18, wherein one or both of the first control operation or the second control operation have associated therewith a control magnitude, wherein the control magnitude is a function of the object rotation velocity.

* * * * *